United States Patent [19]

Yamamoto et al.

[11] Patent Number: 5,257,352
[45] Date of Patent: Oct. 26, 1993

[54] INPUT/OUTPUT CONTROL METHOD AND SYSTEM

[75] Inventors: Akira Yamamoto, Sagamihara; Toshiaki Tsuboi, Kawasaki; Takao Sato, Sagamihara; Yoshihiro Asaka, Hiratsuka; Shigeo Honma, Odawara; Shigeru Kishiro, Odawara; Michio Miyazaki, Odawara; Yoshiaki Kuwahara, Odawara; Hiroyuki Kitajima, Yokohama, all of Japan

[73] Assignees: Hitachi, Ltd., Tokyo; Hitachi Microcomputer Engineering Ltd., Kodaira, both of Japan

[21] Appl. No.: 548,228

[22] Filed: Jul. 5, 1990

[30] Foreign Application Priority Data

Jul. 5, 1989 [JP] Japan ................................. 1-171812

[51] Int. Cl.$^5$ ............................................. G06F 13/00
[52] U.S. Cl. ..................................... 395/275; 395/425
[58] Field of Search ................... 364/DIG. 1, DIG. 2; 395/275, 425

[56] References Cited

U.S. PATENT DOCUMENTS 4,425,615 1/1984 Swenson ........................... 395/425

Primary Examiner—Robert L. Richardson
Attorney, Agent, or Firm—Antonelli, Terry, Stout & Kraus

[57] ABSTRACT

An input/output control apparatus connected to a plurality of input/output units such as disc systems and an input/output control method. A cache memory is divided into a plurality of storage areas for data management. Data stored in the disc systems are stored in the storage areas. In response to an output request from a HOST system to the disc systems, data outputted from the latter are stored in the storage areas of the cache memory. The data stored in the storage areas and outputted therefrom in response to the output request are transferred to the disc systems. The storage areas storing the data requested and not yet stored in the disc systems are grouped correspondingly to the disc systems where the output data are to be stored. The resulting group is managed as a first attribute group. Write-after processing for every disc units can be executed in parallel efficiently without involving high processing overhead.

25 Claims, 17 Drawing Sheets

DIRECTORY DATA STRUCTURE

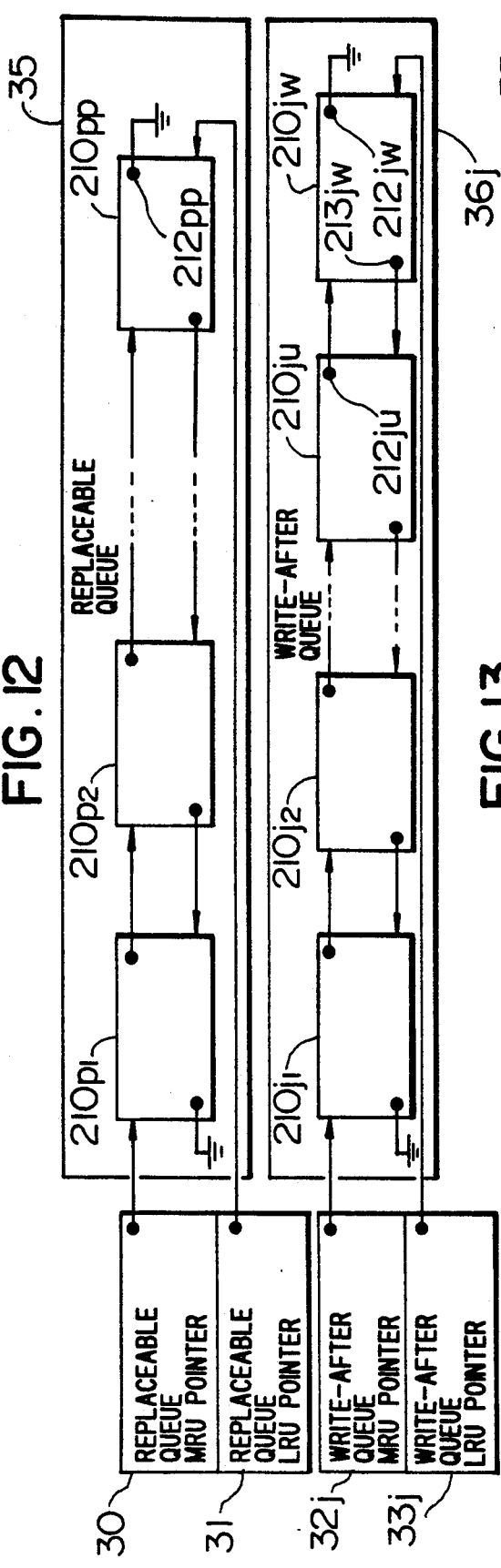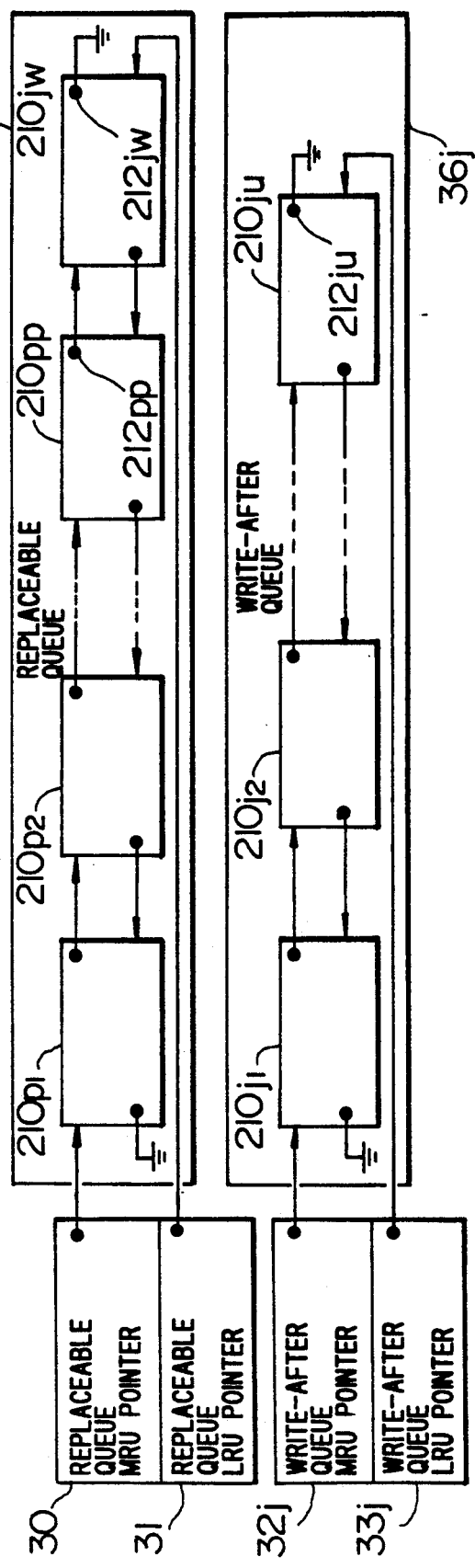

INPUT/OUTPUT CONTROL METHOD AND SYSTEM

BACKGROUND OF THE INVENTION

The present invention relates generally to an input/output control method with a cache memory, a control apparatus or controller in which the control method is adopted and a computer system which incorporates the control apparatus. More particularly, the present invention is concerned with a cache managing or controlling technique for a disc controller equipped with a cache memory.

As one of the cache managing or controlling techniques for a disc controller equipped with a cache known heretofore, there may be mentioned a system disclosed in JP-A-55-117780 according to which slots, i.e. data storage units for the cache memory are managed with the aid of a single LRU (Least Recently Used) chain. Correspondence relation is established between the individual slots and tracks of a disc unit which is under the control of the disc controller. Upon reception of data to be written in the disc unit (hereinafter also referred to as the write data) from a HOST system, the disc controller writes the data not only in the cache but also in the disc unit. Accordingly, coincidence is always found between the content of the cache and that of the disc unit.

When new data is to be written in the cache from the disc unit through the disc controller, the slot which has not been accessed by a HOST system for the longest period (i.e. the LRU slot) is selected to be placed with the new data. For selecting the slot remaining unaccessed for the longest period, the LRU chain mentioned above is made use of.

In JP-A-59-33689, there is disclosed a method of allocating the data storage units or slots to a disc cache memory. However, neither disclosure nor suggestion is found in this publication concerning a managing technique or structure of the data storage units or slots in this publication.

There is disclosed in JP-A-59-15563 a technique for imparting a write-pending function to the disc controller. With the phrase "write-pending function", it means the function or capability of writing data in the disc unit after the time point at which the so-called write data are written in the cache through the disc controller. In this conjunction, it is noted that when the write-pending function is provided, the content of the cache does not always coincide with that of the disc unit. Under the circumstances, a nonvolatile memory is incorporated in the disc controller independent of the cache to thereby allow the write data to be stored in duplicate in both the nonvolatile memory and the cache memory in an effort to ensure the reliability of the content of the cache.

The prior art techniques and in particular the system imparted with the write-pending function mentioned above suffer from problems such as described below.

First, there arises such a possibility that at the time point when a slot is selected to be allocated to a new track on a disc by the disc controller (hereinafter also referred to simply as the controller), the data which has not yet been written in the disc unit (also referred to simply as the disc) may remain in the slot. Such data is termed write-pending data. When the write-pending data exists in the slot, it is required to write once the write-pending data in the disc. Consequently, the time taken for writing the write-pending data involves a waiting time in the slot allocation.

When a plurality of discs are connected to a single controller, it is desirable or necessary to control the discs in parallel for the purpose of enhancing the efficiency or performance of the whole system. In order to realize such parallel control of the discs in a facilitated manner, it becomes an important matter to make available a novel managing and controlling method for the discs and the disc cache (also referred to simply as cache).

A next problem to be solved is seen in what apportionment there should be stored in the cache the data already written in the disc and the write-pending data. The problem of such data apportionment bears more or less dependency to the quantity or amount of data for storage (memory capacity), a time period during which the data is stored in the cache or a period for which no access is made.

In the case where the nonvolatile memory is provided, a problem to be solved is encountered when the capacity of the nonvolatile memory is smaller than that of the cache. In that case, the total amount of the data not yet written in the disc (hereinafter also referred to as the write-pending data) must not exceed the capacity of the nonvolatile memory. Otherwise, provision of the nonvolatile memory would be purposeless or meaningless. Accordingly, the cache management and control need to be realized by taking into consideration the restriction imposed on the capacity mentioned above.

SUMMARY OF THE INVENTION

It is an object of the present invention to provide an input/output control method for a disc system which method is capable of selecting with high efficiency the slots for writing data in the disc from those in the cache of a disc input/output controller in which the write-pending data are stored. It is also an object of the invention to provide an apparatus for carrying out the method mentioned above.

Another object of the present invention is to provide an input/output control method for a disc system which method allows the slots storing therein the write-pending data and those storing no write-pending data to be appropriately apportioned within the cache memory in consideration of a cache hit ratio which will be elucidated later on. It is also an object of the invention to provide an apparatus for carrying out the abovementioned method.

A further object of the present invention is to provide a method for selecting efficiently the slots of which data are to be written in the disc from those slots storing the write-pending data through a controller which is provided with a nonvolatile memory in addition to the cache for coping with failure or fault of the cache.

Still another object of the present invention is to provide a control apparatus which is capable of selecting efficiently the slots whose data are to be written onto the disc from those slots which store therein the write-pending data.

Yet another object of the present invention is to provide a computer system including a control apparatus which is capable of selecting efficiently the slots whose data are to be written in the disc from those slots which store therein the write-pending data.

For achieving the objects mentioned above, the present invention may be worked in modes described below.

In a controller connected to input/output units, cache memories are put in groups by every input/output unit to which the write-pending data stored in the cache memory is to be written. In response to an input/output request issued from a HOST system, data is inputted/outputted to/from the cache memories. Subsequently, the data placed in the cache memories are transferred to the input/output units. The above is a general feature of the present invention.

In order to prevent the slots storing the write-pending data from being allocated to new tracks, the write-pending data are managed in such manners as follows.

(1) The write-pending data are managed by classifying the slots into those storing the write-pending data and those having no write pending data stored therein (i.e. the slots for which data stored therein have all been written in the disc).

(2) When the slot is to be allocated in correspondence to a new track, the slot of concern is selected from the those having no write-pending data stored therein.

The disc control of high efficiency can be realized by securing a high parallelism in the write operation of the write-pending data to the discs (hereinafter referred to as the write-pending processing) as performed through the controller. This can be achieved by grouping the slots storing the write-pending data into sets corresponding to the discs, respectively. In other words, the slot management performed in dependence on whether the write-pending data are stored or not in the slot, as described previously, are further finely divided in correspondence to the individual discs. Each group of slots is thus managed in unit by using the LRU chain mentioned hereinbefore.

The problem residing in what apportionment the data already written in the disc and the write-pending data are to be stored in the cache can be solved by controlling the apportionment by comparing the time for which the slot storing the write-pending data therein is retained in the cache with the time or period during which the slot storing no write-pending data therein is retained in the cache.

In conjunction with the apportionment control mentioned above, the problem mentioned hereinbefore arises in connection with the capacity of the nonvolatile memory if it is provided. This problem can successfully be disposed of by executing the writing operation of the write-pending data to the disc when the ratio of the quantity (amount) of the write-pending data to the capacity of the nonvolatile memory exceeds a predetermined value, i.e. when the quantity (amount) of the write pending data occupying the nonvolatile memory exceeds a predetermined value.

According to the teaching of the invention, the slots corresponding to the tracks and containing the write-pending data are managed independent of the slots corresponding to the tracks and containing no write-pending data. At that time, the slots containing the write-pending data not yet written in the disc are managed with the aid of the LRU chain on a disc basis.

By managing the slots in this manner, and selecting the slots to which no access has been made from the HOST system for a long time to thereby execute the write-pending processing in parallel for the individual discs, respectively, there can be realized a high system performance.

According to the teachings of the invention outlined above, the slots having the data to be written in the disc can be selected with a high efficiency from those storing the write-pending data. The slots in which the write-pending data are stored and the slot having no write-pending data stored therein can be apportioned within the cache memory appropriately in view of the hit ratio of the cache. In the case where the nonvolatile memory is provided in addition to the cache, the slots having the data to be written in the disc can be selected from those storing the write-pending data with a high efficiency.

Besides, there can be implemented the controller and a computer system in which the slots storing the data to be written in the discs can be selected from the slots storing the write-pending data.

BRIEF DESCRIPTION OF THE DRAWINGS

FIGS. 12 and 13 are diagrams for illustrating the contents of processing performed by the director upon reception of the completed positioning indication from the disc unit in the write-after processing;

DESCRIPTION OF THE PREFERRED EMBODIMENTS

Now, the present invention will be described in greater detail in conjunction with the preferred or exemplary embodiments thereof by reference to the accompanying drawings.

At first, description is directed to a first embodiment of the invention.

Figure 2:
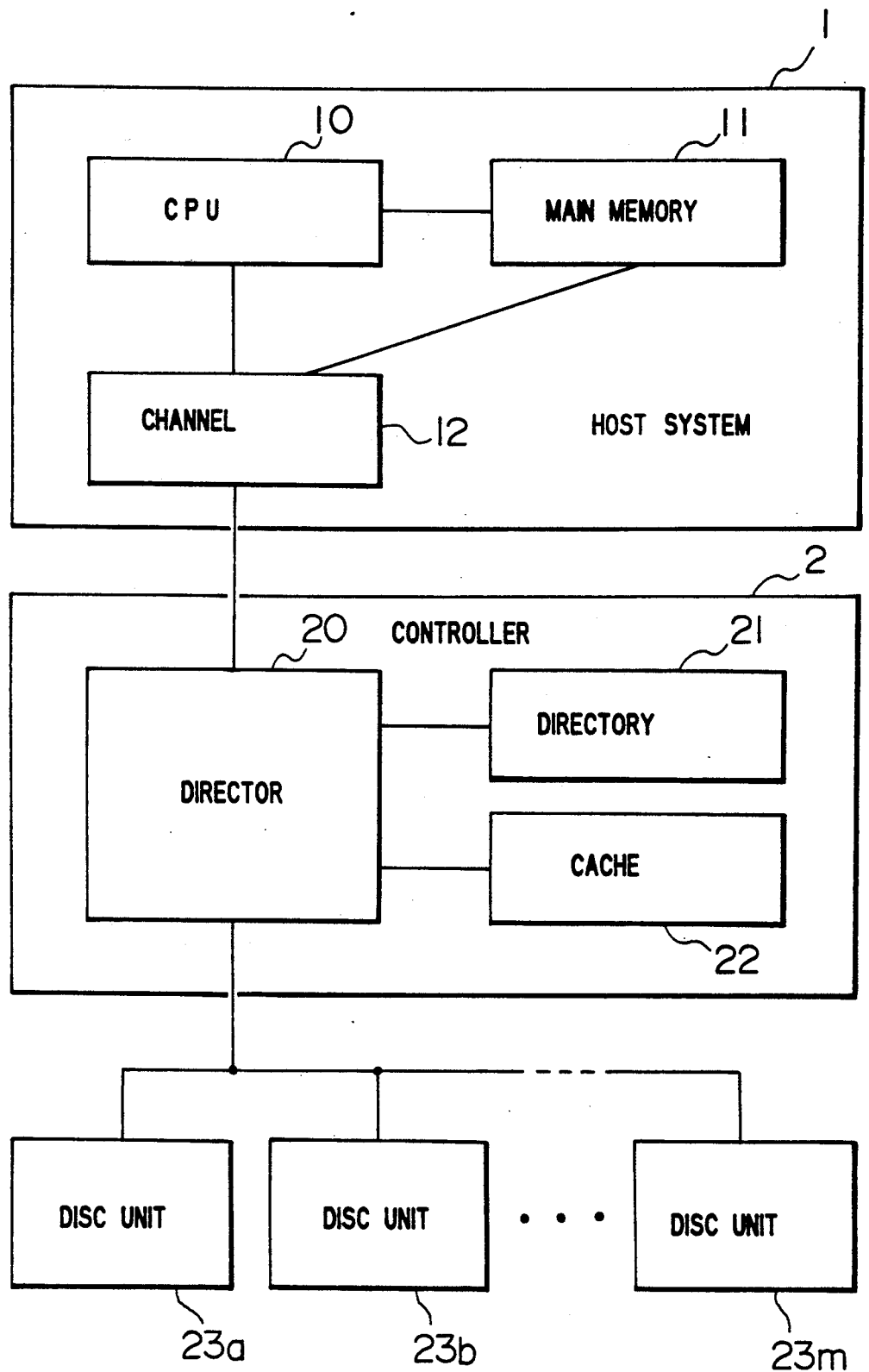
FIG. 2 is a schematic block diagram showing, by way of example, a preferred structure of a computer system to which the present invention can be applied.

FIG. 2 shows a general arrangement of a computer system to which the invention is applied. As can be seen in this figure, the computer system is so constituted as to comprise a central processing unit or CPU 10, a main storage 11, a channel unit 12, a controller 2 and one or more disc units 23j (j=a, b, . . . , m) (hereinafter also referred to simply as the discs) each having a storage capacity of 1 Gbyte, for example. The controller 2 responds to an input/output request issued by the CPU 10 or the main storage 11 and supplied through the channel 12 to perform data read/write operation to the discs 23j.

In the following description, the CPU 10, the main storage 11 and the channel 12 are collectively and generally called the HOST system 1.

The controller 2 comprises a director 20, a directory 21 and a disc cache memory 22 (hereinafter also referred to as the cache) having a capacity, for example, in a range of 32 Mbytes to 512 Mbytes.

The director 20 is a processor which is responsible for the control internally of the controller 2 and the control of data transfer with the HOST system and data transfer with the discs 23j.

The cache 22 is a memory for storing those of data stored in the discs 23j which are accessed with a high frequency from the HOST system 1.

The directory 21 is a memory for storing information or data required for management and control of the cache 22 by the director 20.

Figure 3:
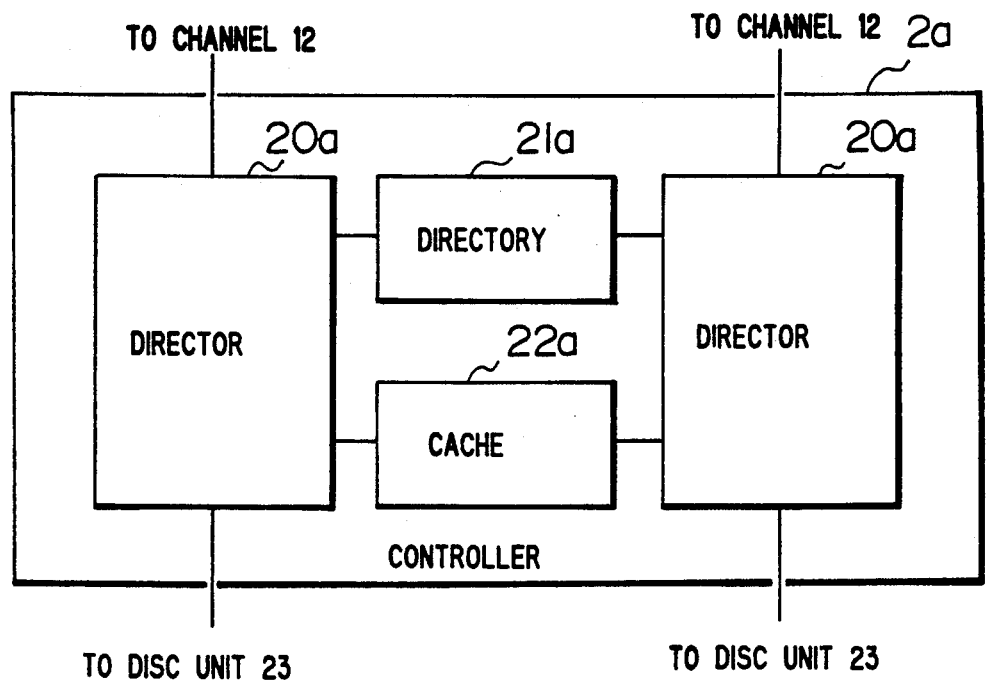
FIG. 3 is a schematic block diagram showing, by way of example, a modified structure of a controller to which the present invention can be applied.
Figure 4:
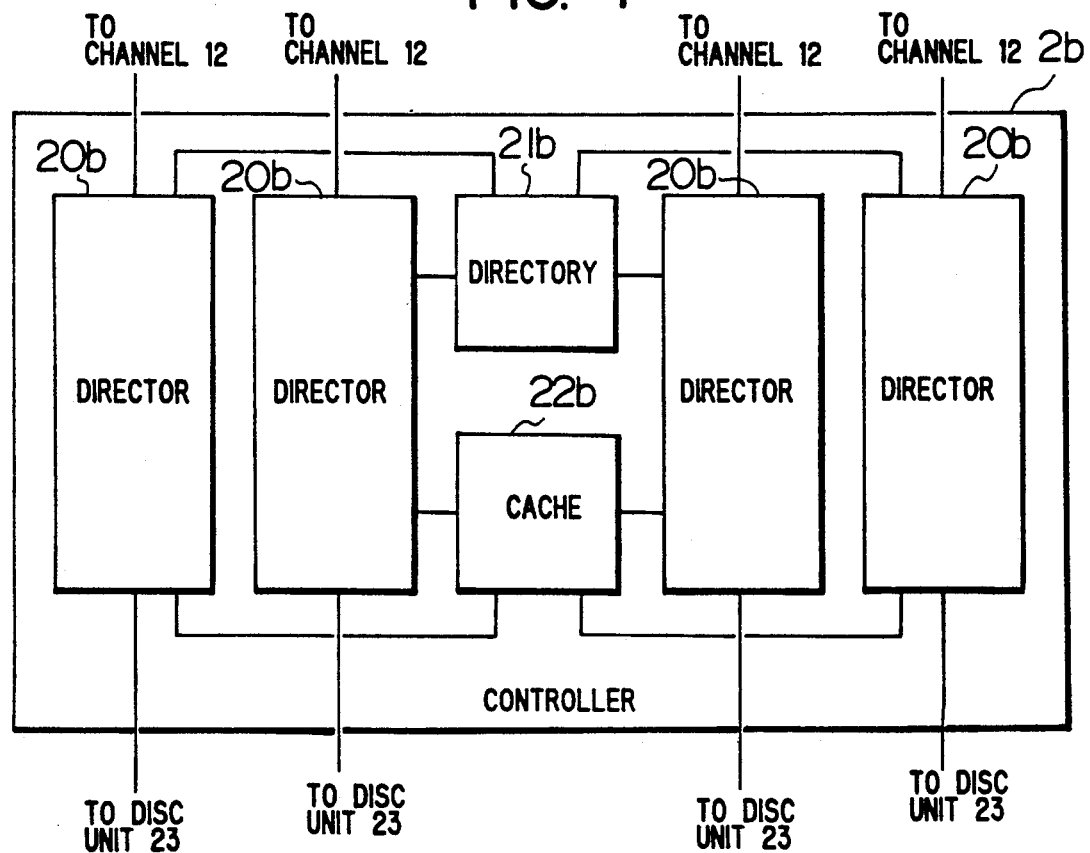
FIG. 4 is a schematic block diagram showing, by way of example, another modified structure of a controller to which the present invention can be applied.

The controller 21 is shown in FIG. 2 as including a single directory for the purpose of exemplification. In FIGS. 3 and 4, there are shown versions 2a and 2b of the controller having structures modified from that of the controller 2 shown in FIG. 2. More particularly, the controller 2a shown in FIG. 3 includes two directors both denoted by 20a and each connected to the directory 21a and the cache 22a. On the other hand, the controller 2b shown in FIG. 4 includes four directors 20b each connected to the directory 21b and the cache 22b.

With the structures of the controller 2a or 2b shown in FIG. 3 or FIG. 4, it is contemplated to realize a high-speed operation by enhancing the parallelism in the data transfer and secure a high reliability by multiplexing the data transfer. Accordingly, there are provided a plurality of paths for the data transfer with the HOST system 1 and the discs 23j in correspondence to the number of the directors 20a or 20b.

In this conjunction, it should be noted that the present invention can be applied independent of the number of the directors which the controller incorporates therein. In other words, the controller implemented according to the teaching of the invention can operate in similar or same manner to similar or same effects regardless of difference in the number of the directors incorporated in the controller.

In the following direction, it is assumed that the controller of concern is implemented in the structure of the controller 2 shown in FIG. 2, unless specified otherwise.

Description will now be made of operation of the controller 2 shown in FIG. 2. Incidentally, an allocation unit of data stored in the cache 22 is referred to as the slot, and it is assumed that the data stored in one slot corresponds to the data stored in one track of the disc 23j. In this conjunction, the track may have a capacity of 48 Kbytes, for example. To say in another way, the quantity or amount (size) of data stored in one slot is assumed to be equal to the quantity (size) of the data stored on one track of the disc 23j. It should however be understood that the invention is never limited to such correspondence between the slot and the track as mentioned above but the size of the slot may correspond to an appropriate quantity of a record which is a unit read or written in or from the disc 23j.

When the director 20 receives an input/output request to the disc 23j from the HOST system 1, the search is first performed internally of the directory 21 for checking whether or not there exists in the cache 22 the slot corresponding to the track on the disc 23j to where the input/output operation indicated by the input/output request received from the HOST system 1 will be executed. In case the slot corresponding to the track where the input/output operation will be executed exists in the cache 22, i.e. when the slot corresponding to the track where the requested input/output operation will be executed can be detected as the result of the search, this is referred to as that "hit" occurs. On the other hand, when the slot corresponding to the track where the requested input/output operation will be executed could not be found after the search, this is referred to as "miss".

As the types of the input/output request from the HOST system 1, there can be mentioned a read request and a write request. Operation of the director 20 for the read request differs from that for the write request. Parenthetically, with the phrases "read request" and "write request", it is intended to mean the corresponding operation requests issued by the HOST system 1 to the discs 23j.

Now, let's assume that the hit occurs, i.e. it has been detected that there exists in the cache 22 the slot corresponding to the track on the disc 23j where the input-/output operation indicated by the input/output request received by the director 20 will be executed. In that case, when the input/output request received is the read request, then the data in the hit slot is transferred to the HOST system 1. On the other hand, when the input- /output request received is the write request, data transferred from the HOST system 1 is written in the hit slot which corresponds to the write request.

Next, let's suppose that the miss occurs, i.e. it has been detected that there exists in the cache 22 no slot which corresponds to the track on the disc 23j where the input/output operation indicated by the input/output request received by the director 20 will be executed. In that case, the director 20 makes access to the discs 23j. When the input/output request received is the read request, data requested is read out from the disc 23j to be transferred to the HOST system 2. On the other hand, when the received input/output request is the write request, the data transferred from the HOST system 1 is written in the disc 23j in correspondence to the write request. Upon occurrence of the miss, data is transferred to the cache 22 from the disc 23j, details of which will be described later on.

As will be understood from the above description, when the slot corresponding to the track where the input/output operation will be executed is absent in the cache 22, i.e. when the miss occurs, the effect brought about by the provision of the cache can no more be enjoyed.

In contrast, when the hit takes place, the data transfer is performed between the HOST system 1 and the cache 22, whereby the input/output processing can be performed at a high speed. Such high-speed input/output processing may be explained by the fact that the data transfer with the cache 22 constituted by a semiconductor memory can be performed at a higher speed when compared with the data transfer with the discs 23j.

As will be apparent from the foregoing, upon occurrence of the hit to the write request, there takes place such situation that the data is written only in the cache 22 without being written on the disc 23j. Consequently, the data in the cache 22 not written in the disc 23j has to be written in the disc 23j in the latter independent of the write request from the HOST system 1. The processing performed by the director 20 for executing this type of write operation is herein referred to as the "write-after processing". Further, the data to be written by the write-after processing is herein referred to as the write-after data.

Figure 5A:
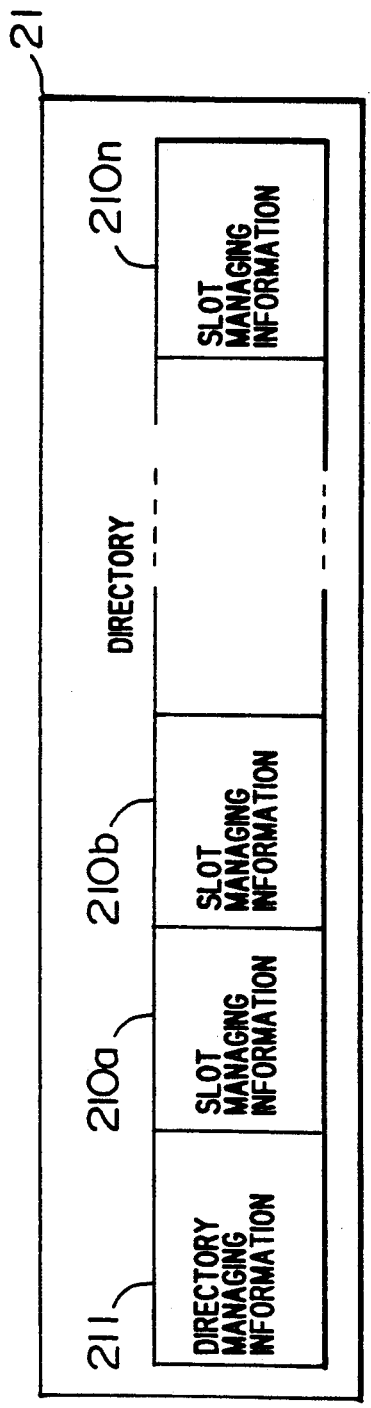
FIG. 5A is a diagram showing schematically a structure of the directory according to an embodiment of the invention.
Figure 5B:
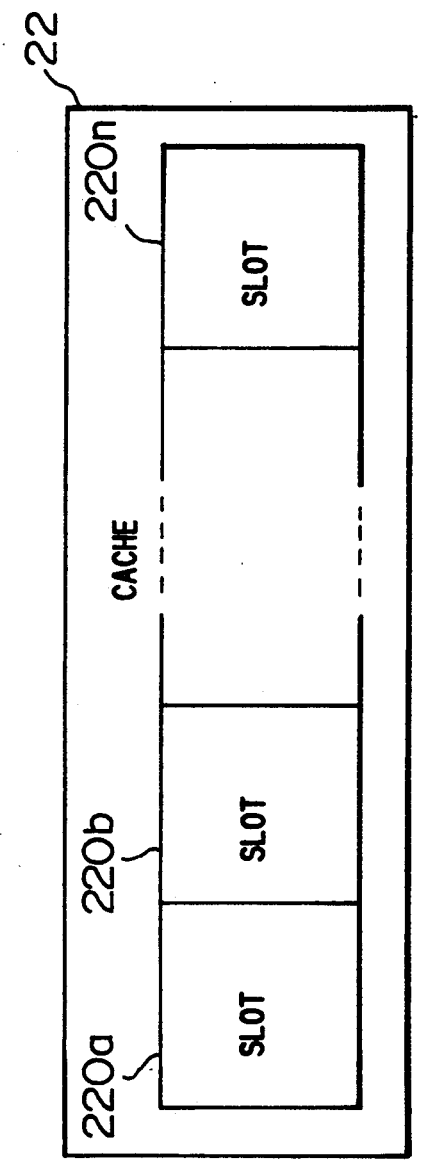
FIG. 5B is a diagram showing schematically a structure of a cache according to an embodiment of the invention.

FIG. 5A shows a structure of the directory 21, while FIG. 5B shows a structure of the cache 22 corresponding to that of the directory 21 shown in FIG. 5A. The cache 22 is divided into a plurality of slots $220_i$ (where $i=a, b, \ldots, n$). There are provided in the directory 21 storage areas for storing slot managing information $210_i$ ($i=a, b, \ldots, n$) corresponding to the individual slots $220_i$, respectively. It is assumed that the slot management information $210_i$ and the slot $220_i$ having the respective affixes of a same value correspond to each other. Further provided in the directory 21 an area for storing directory managing information 211 which serves for managing the slot managing information $210_i$.

In the following, the various information storage areas or tables will also be referred to simply as the information.

Figure 6:
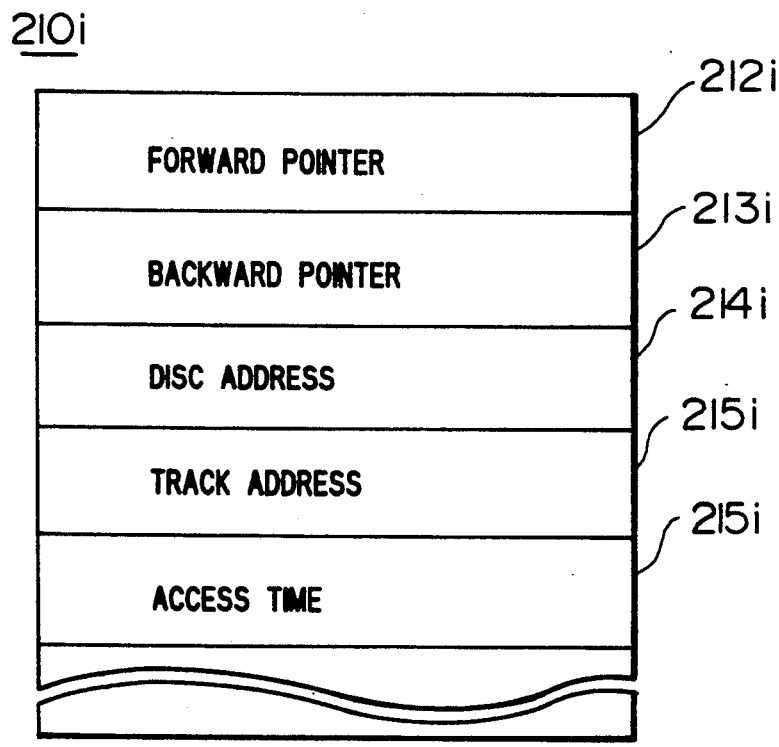
FIG. 6 is a diagram showing, by way of example, a slot managing information table.

FIG. 6 shows a structure of the storage area or table for the slot managing information $210_i$. In this figure, only those portions relevant to the invention are shown. The storage area for the slot managing information $210_i$ is constituted by subareas for a forward pointer $212_i$, a backward pointer $213_i$, a disc address $214_i$, a track address $215_i$ and an access time information $216_i$, respectively.

Concerning the pointers stored in the forward pointer subarea $212_i$ and the backward pointer subarea $213_i$, description will be made later on.

The disc address $214_i$ indicates an address on the disc $23_i$ which corresponds to the slot indicated by the slot managing information $210_i$. The track address $215_i$ indicates an address of a track on the disc $23_j$ which track corresponds to the slot $220_i$ indicated by the slot managing information $210_i$. The access time $216_i$ indicates a time point when the slot indicated by the slot managing information $210_i$ was accessed by the HOST system 1 most recently.

In conjunction with the operations performed in response to the input/output request described hereinbefore, let's consider again the operation which is carried out upon occurrence of the miss. With the occurrence of "miss", it is intended to mean that there exists in the cache 22 no slot that corresponds to the track of concern on the disc 23j which is indicated by the input/output request received by the director 20. Accordingly, if this state continues as it is, the probability of occurrence of the miss in succession is high. In order to evade such situation, it is necessary to store in the cache 22 the data on the track of concern for which the miss has occurred. To this end, the slot which is accessed only at a low frequency is selected to be stored with the data on the track of concern for which the miss occurred.

In connection with execution of the processing to the end mentioned just above, it is an important matter or problem how to select in a facilitated manner the slot which has no write-after data stored therein and which is accessed only at a low frequency. Here, the slot in which the write-after data is not stored is referred to as the replaceable slot, while the slot having the write-after data stored therein is referred to as the write-after slot.

Figure 1:
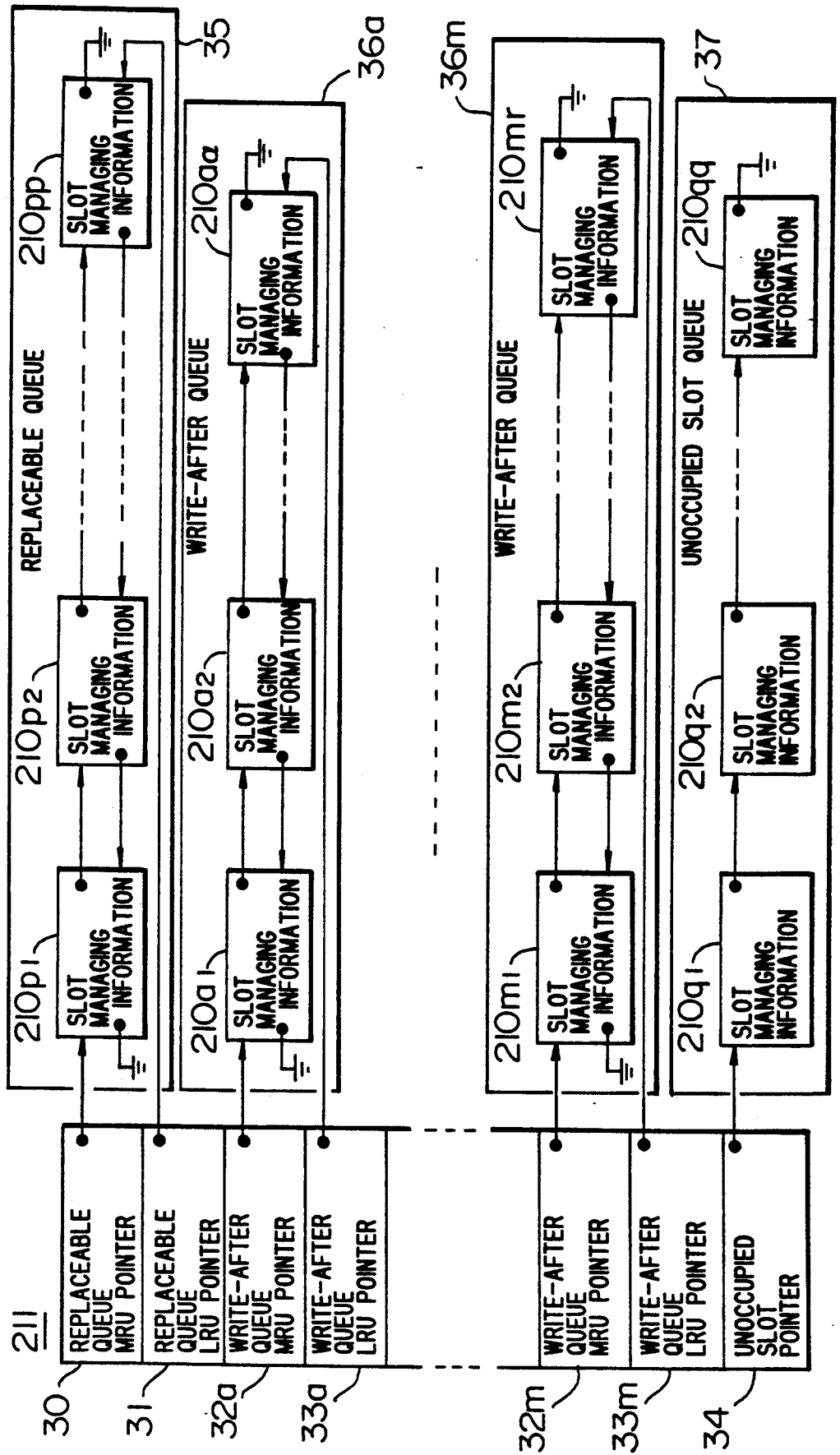
FIG. 1 is a diagram showing in detail a structure of a directory according to an exemplary embodiment of the present invention.

For solving the problem mentioned above, it is taught according to an aspect of the present invention to implement the directory 21 shown only schematically in FIG. 5A in such a concrete structure as shown in FIG. 1.

Referring to FIG. 1, the storage area for the directory managing information 211 is composed of subareas for a replaceable queue MRU (Most Recently Used) pointer 30, a replaceable queue LRU (Least Recently Used) pointer 31, a write-after queue MRU pointer $32_j$ (j=a, b, ..., m), a write-after queue LRU pointer $33_j$ (j=a, b, ..., m) and an unoccupied slot pointer 34, respectively.

The storage areas for the slot managing information $210_i$ are managed as the queues LRU in correspondence to the pointers mentioned above, respectively. For facilitating the understanding of the management method, the slot managing information $210_i$ are shown with different affixes in FIG. 1.

The slot managing information $210_{p1}, 210_{p2}, \ldots 210_{pp}$ for the replaceable slots are arrayed in the sequence of LRU (as viewed from the right-hand side) and managed as the replaceable queue 35. The replaceable queue MRU (Most Recently Used) pointer 30 stores a pointer value indicating the storage area for the slot managing information $210_{p1}$ for the replaceable slot accessed most recently (i.e. located at the MRU position) in the replaceable queue 35. The forward pointer $212_{p1}$ of the slot managing information $210_{p1}$ (the affix i in FIG. 6 is to read p1) stores a pointer value indicating the storage area for the slot managing information $210_{p2}$. In this manner, each of the forward pointers of the individual slot managing information stores the pointer value which indicates the storage area for the succeeding slot managing information. For example, a null value is stored in the forward pointer $212_{pp}$ to the slot managing information $210_{pp}$ (at the LRU position) which has not been accessed for the longest period indicates termination.

The replaceable queue LRU pointer 31 stores a pointer value indicating the storage area for the slot managing information $210_{pp}$ of the replaceable slot at the LRU position in the replaceable queue 35. The backward pointer is used for the linking or connection of the pointers to the individual managing information of the replaceable queue 35 and for the termination in a similar manner to the forward pointer described above except for difference in the direction for the connection.

The slot managing information of the writeafter slots for storing the write-after data are divided in correspondence to the discs $23_j$, whereon the slot managing information $210_{j1}, \ldots, 210_{j\beta}$ resulting from the division are arrayed in the LRU sequence, and each group of the slot managing information arrayed in the LRU sequence is managed as the write-after queues $36_j$ (j=a, b, ..., m). The write-after queue MRU pointers $32_j$ (j=a, b, ..., m) store pointer values indicating the storage areas for the slot managing information of the slots storing the write-after data (at the MRU position) accessed most recently. The pointers $33_j$ (j=a, b, ..., m) to the write-after queue LRU store the pointer values indicating the storage areas for the slot managing information of the slots storing the write-after data which have not been accessed for the longest period (at the LRU position).

As described hereinbefore, the pairs of the write-after queue MRU pointers $32_j$ and the write-after queue LRU pointers $33_j$ are provided in correspondence with the individual discs $23_j$, respectively. Parenthetically, the linking method and the termination method of the individual slot managing information are similar to those adopted for the replaceable queue 35.

In this manner, each of the slot managing information connected to the replaceable queue 35 and the write-after queue $36_j$ contain the forward pointer $212_i$ and the backward pointer $213_i$. It should be mentioned once again that the forward pointer $212_i$ is affixed in such direction as to orient toward the slot managing information located at the LRU position from the slot managing information at the MRU position in each queue while the backward pointer $213_i$ is oriented reversely. Accordingly, the forward pointer $212_i$ is terminated at the managing information storage area located at the LRU position while the backward pointer is terminated at the managing information storage area located at the MRU position. Thus, the replaceable queue 35 and the write-after queue $36_j$ can be managed and controlled with the aid of the respective forward and backward pointers $212_i$ and $213_i$.

In the cache 22, there may exist the slot not used, i.e. the slot in which data corresponding to that of the disc $23_j$ is not stored. This slot is referred to as the idle or unoccupied slot. The slot managing information corresponding to these idle or unoccupied slots are also managed and controlled in the form of queue, which is referred to as the unoccupied slot queue 37. The slots $(210_{q1}, 210_{q2}, \ldots, 210_{qq})$ managed in the form of the unoccupied slot queue 37 may be arrayed in random sequence. In the case of the instant embodiment, it is assumed that the unoccupied slots are managed by a LIFO (Last-In, First-Out) method. Accordingly, there is required only one pointer for managing the unoccupied slot queue 37 which pointer indicates or points to the start unoccupied slot managing information $210_{q1}$. This pointer is referred to as the unoccupied slot pointer and denoted by 34.

When the slot managing information $210_i$ are connected to the replaceable queue 35 or to the write-after queue $36_j$, the values mentioned hereinbefore are stored in the associated forward pointer $212_i$ and backward pointer $213_i$. More particularly, the slot managing information $210_i$ to be newly connected to the replaceable queue 35 or to the write-after queue $36_j$ is connected to the MRU position of the corresponding queue. Accordingly, there is stored in the associated forward pointer $212_i$ the pointer value to the storage area for the slot managing information $210_i$ which was connected to the MRU position immediately before. The backward pointer is terminated.

When the slot managing information $210_i$ is connected to the unoccupied slot queue 37, only the area for the forward pointer $212_i$ is used, and the data stored in other areas such as for the backward pointer $213_i$ are of no significance.

Here, description will be made concerning the access time $216_i$ for the slot managing information $210_i$ shown in FIG. 6. In this conjunction, it should be recalled that connection of the slot managing information to the replaceable queue 35 or to the write-after queue $36_j$ is always made at the MRU position. It can thus be said that the connection of the slot managing information to either one of the abovementioned queues means that the corresponding slot was accessed. To say in another way, the access time $216_i$ represents the time point at which the slot managing information $210_i$ was moved to the MRU position of the queue to which it belongs.

With the structures of the directory 21 an the cache 22, the processing executed by the director 20 is performed in such a manner as described below.

Of the processings executed by the director 20, the processing related to the replaceable queue 35 is well known in the art. Accordingly, the following description is directed to only the processings that are related to the write-after queue $36_j$.

Figure 7:
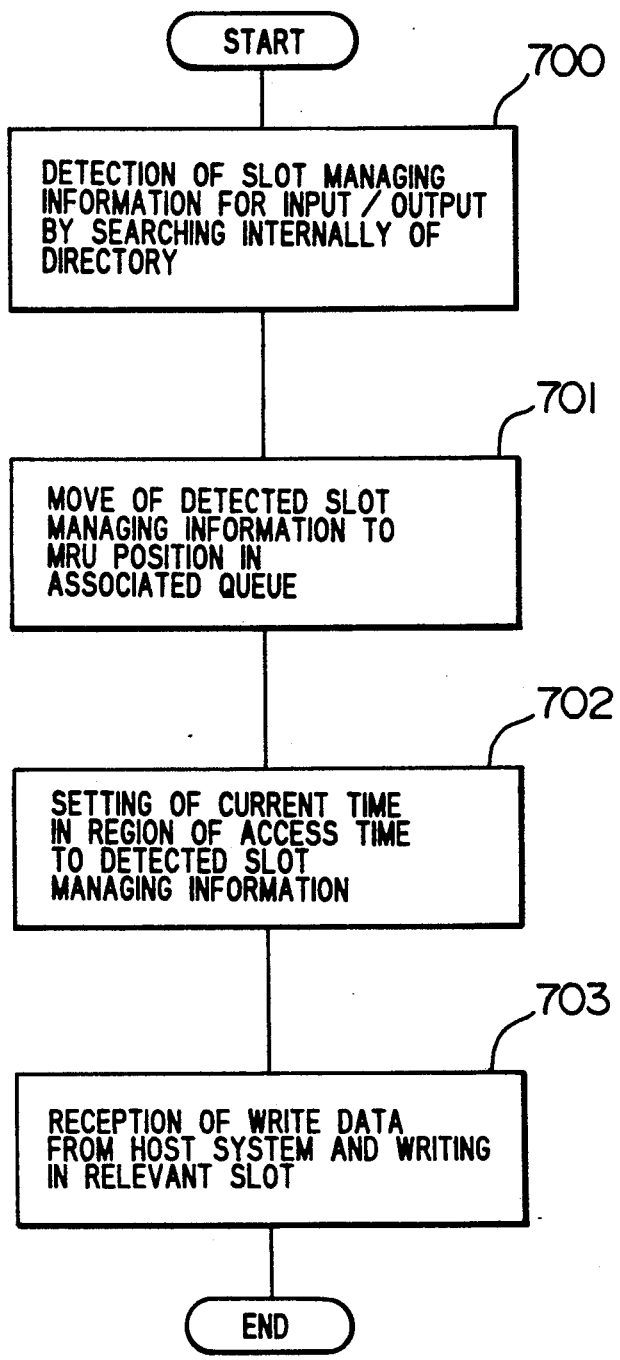
FIG. 7 is a flow chart showing a write hit processing performed by a director in response to a write request received from a HOST system.

FIG. 7 shows a processing executed by the directory 20 when the hit occurs to the write request received from the HOST system 1.

In addition to the write request, the director 20 receives from the HOST system 1 the disc address of the disc $23_j$, the track address, and others involved in the write processing to be executed. The director 20 then refers to the disc address of the disc $23_j$ as well as the track address received from the HOST system 1 to retrieve the slot managing information $210_{jt}$ from the directory 21 by a method known per se. As the result, the slot managing information $210_{jt}$ (FIG. 8) corresponding to the slot subjected to the input/output operation is detected (step 700).

The director 20 moves the slot managing information $210_{jt}$ to the position (FIG. 9) indicated by the write-after queue MRU pointer $32_j$ of the relevant disc $23_j$ (step 701).

Figure 8:
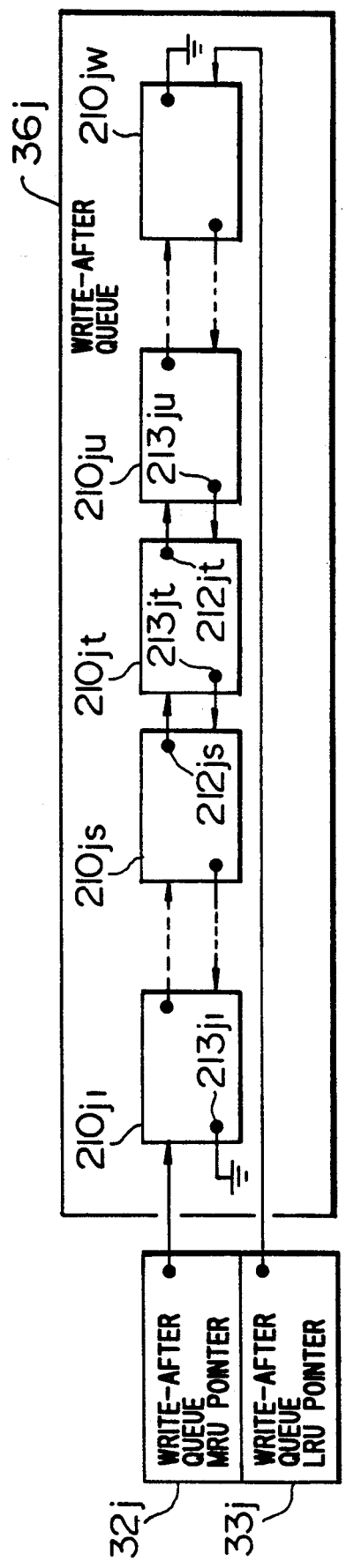
FIGS. 8 and 9 are diagrams for illustrating the write hit processing performed by the director.
Figure 9:
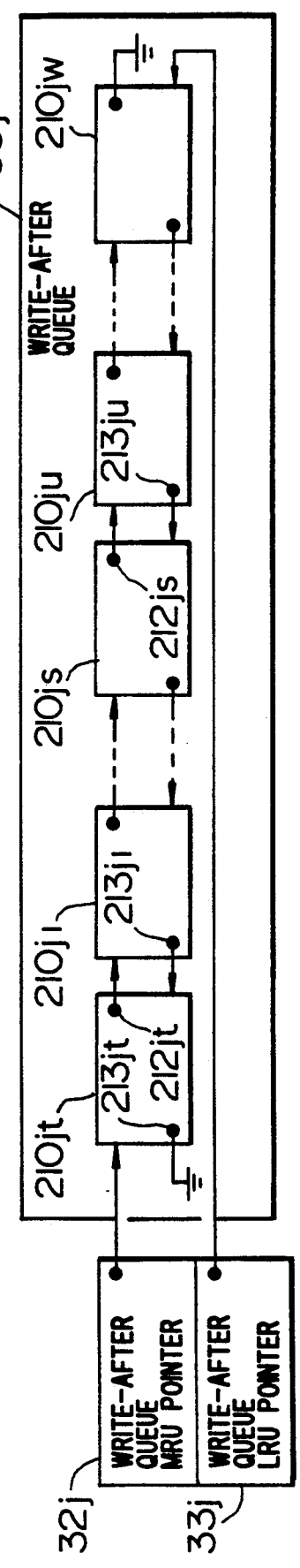

The processing at the step 701 will be explained in more concrete by reference to FIGS. 8 and 9 which show in the extracted state the write-after queue $36_j$ shown in FIG. 1, and the write-after queue MRU pointer $32_j$ and the write-after queue LRU pointer $33_j$ both corresponding to the abovementioned queue $36_j$. The state prevailing before the execution of the processing step 701 in FIG. 7 is shown in FIG. 8 while the state after the execution thereof is shown in FIG. 9.

The value (indicating the slot managing information $210_{ju}$) stored in the forward pointer $212_{jt}$ of the slot managing information $210_{jt}$ is stored in the forward pointer $212_{js}$ of the slot managing information $210_{js}$. The value (indicating the slot managing information $210_{js}$) stored in the backward pointer $213_{jt}$ of the slot managing information $210_{jt}$ is stored in the backward pointer $213_{ju}$ of the slot managing information $210_{ju}$. The value (indicating the slot managing information $210_{j1}$) stored in the write-after queue MRU pointer $32_j$ is stored in the forward pointer $212_{jt}$ of the slot managing information $210_{jt}$. The value indicating the slot managing information $210_{jT}$ is stored in the backward pointer $213_{j1}$ of the slot managing information $210_{ji}$ located at the MRU position before execution of the processing of concern. Further, the value indicating the slot managing information $210_{jt}$ is stored in the write-after queue MRU pointer $32_j$. The processings described above in detail are performed at the step 701.

Next, the current time is set at the access time $216_{jt}$ of the slot managing information $210_{jt}$ (step 702). The current time is read out from a timer incorporated in the controller 2, although not shown. At a step 703, the write data is received from the HOST system 1 to be written in the relevant slot $220_{jt}$.

Figure 10:
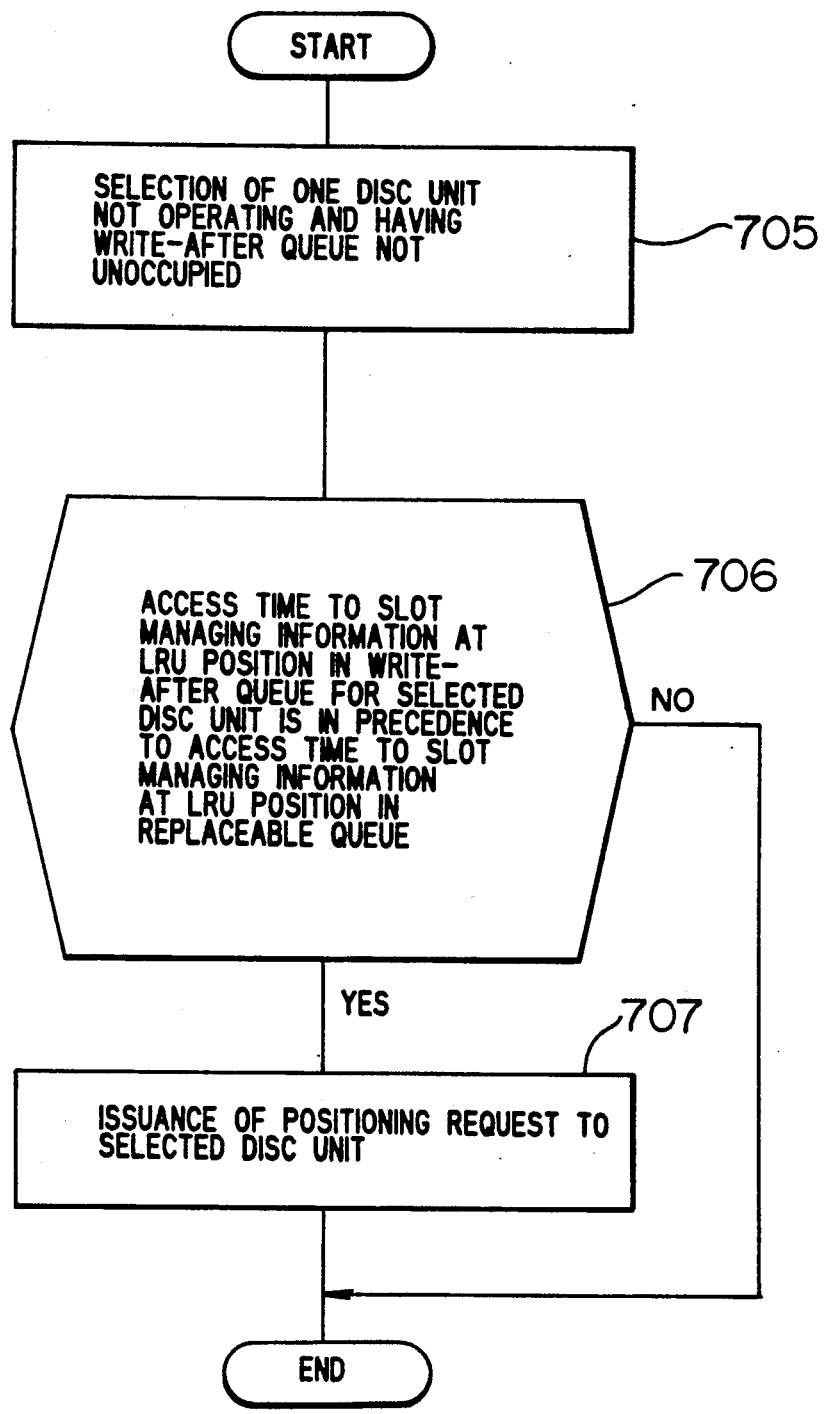
FIG. 10 is a flow chart for illustrating processing performed by the director for issuing a positioning request to a disc unit in the course of a write after processing.

FIG. 10 illustrates in a flow chart the write-after processing to be executed for the disc $23j$. This processing is started when the positioning request is issued from the director 20 provided that the latter has no more processing to be executed. At a step 705, a given one disc $23j$ is selected from the discs which are not currently operating and for which the write-after queue is not idle (i.e. the write-after queue has at least one slot managing information connected thereto).

At a step 706, the access time $216_{jw}$ to the slot managing information $210_{jw}$ indicated by the write-after queue LRU pointer $33j$ of the disc $23j$ is compared with the access time $216_{pp}$ to the slot managing information $210_{pp}$ indicated by the replaceable queue LRU pointer 31. When the former indicates the time point temporally preceding to that indicated by the latter, this means that the write-after data (data not yet written in the disc $23j$) in the slot $220_{jw}$ corresponding to the slot managing information $210_{jw}$ is held or retained within the cache 22 for a longer time than the period during which the data in the slot $220_{pp}$ containing no write-after data is retained in the cache 22. Thus, by writing in the disc $23j$ the write-after data in the slot $220_{jw}$ for which the condition for the decision step 706 is satisfied, the slots containing the write-after data and those containing no write-after data can be retained within the cache 22 in the well balanced state or in an appropriate apportionment.

when the condition for the decision step 706 is satisfied, the positioning request is issued to the disc $23j$ in order to write in the disc $23j$ the write-after data in the slot $220_{jw}$ which corresponds to the slot managing information $210_{jw}$ indicated by the write-after queue LRU pointer $33j$ (i.e. in order to execute the write-after processing) at the step 707 in FIG. 10. Unless the condition for the decision step 706 is satisfied, the processing comes to an end.

Figure 11:
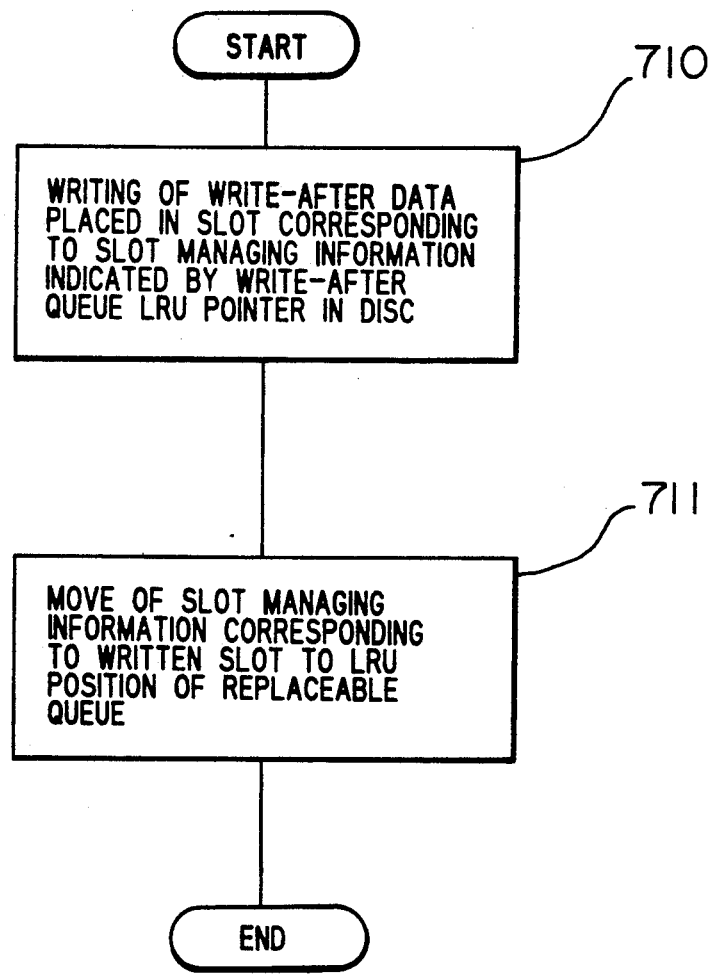
FIG. 11 is a flow chart for illustrating processing performed by the director in the write-after processing upon reception of a completed positioning indication from the disc unit.

FIG. 11 illustrates a processing to be executed upon reception of information indicating the completed disc positioning from the disc $23j$. At a step 710, the write-after data stored in the slot $220_{jw}$ corresponding to the slot managing information $210_{jw}$ indicated by the write-after queue LRU pointer $33j$ of the disc $23j$ is written on the corresponding track.

At a step 711, processing is performed such that the slot managing information $210_{jw}$ is indicated by the replaceable queue LRU pointer 31.

Now, the processing operation at the step 711 will be described below in detail by reference to FIGS. 12 and 13, which show in the extracted state the replaceable queue 35, the write-after queue $36j$ and the pointers for managing these queues which are shown in FIG. 1, wherein FIG. 12 shows the state prevailing before execution of the processing step 711 with FIG. 13 showing the state after the execution thereof.

The value stored in the forward pointer $210_{jv}$ of the slot managing information $210_{jv}$ (which value indicates the slot managing information $210_{jw}$) is set at the forward pointer $212_{pp}$ of the slot managing information $210_{pp}$. The forward pointer $212_{jv}$ of the slot managing information $210_{jv}$ is terminated. The value in the backward pointer $213_{jw}$ for the slot managing information $210_{jw}$ (which value indicates the slot managing information $210_{jv}$) is saved to a work area (not shown). The value stored in the replaceable queue LRU pointer 31 (which value indicates the slot managing information $210_{pp}$) is set at the backward pointer $213_{jw}$ for the slot managing information $210_{jw}$. The value stored in the write-after queue (36) LRU pointer $33j$ (which value indicates the slot managing information $210_{jw}$) is set at the replaceable queue LRU pointer 31. The value saved in the work area (which indicates the slot managing information $220_{jv}$) is stored in the write-after queue (36) LRU pointer $33j$. The forward pointer $212_{jw}$ for the slot managing information $210_{jw}$ is left as being terminated. The above are details of the processing executed at the step 711.

When the memory incorporated in the controller 2 (for serving for the directory 21, the cache 22 and the work area) is a volatile memory, then there arises a problem mentioned below. Namely, when some fault occurs in the power supply for the directory 21 and the cache 22 before performing the write after processing on the disc $23j$, the data which are not yet written on the disc $23j$ will disappear. This problem is very serious. For preventing such problem from occurrence, it is desirable to make nonvolatile the directory 21 and the cache 22.

In the case of the embodiment of the invention described above, in which the slot accessed at a time point earlier than the slot located at the LRU position of the replaceable queue is subjected to the write-after processing with the write-after data being retained within the cache, it is expected that the time required for the disc seek/search can be shortened significantly as a whole.

Further, even when failure such as destruction of the queue or the like should occur, it is possible to prevent the failure from affecting the whole controller and to limit the influence of the failure to the particular one of the discs.

Figure 14:
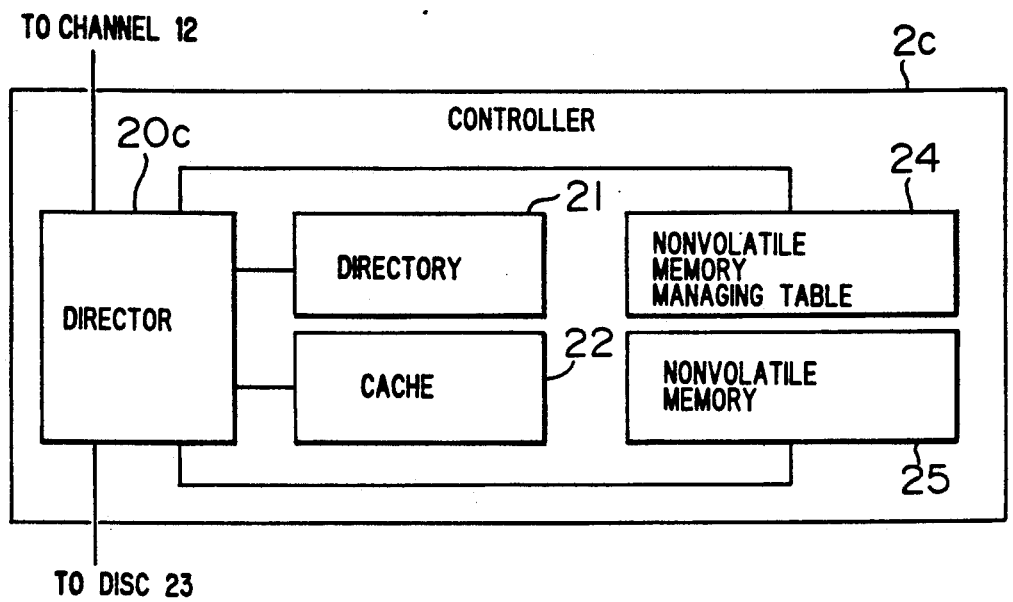
FIG. 14 is a schematic block diagram showing, by way of example, a structure of the controller which is provided with a nonvolatile memory.

Next, a second embodiment of the present invention will be described. FIG. 14 shows a structure of the modified controller 2c which differs from the controller shown in FIG. 13 in that the former includes additionally a nonvolatile memory 25 and a nonvolatile memory management table 24. Stored in the nonvolatile memory 25 are write-after data which are not yet written on the disc $23j$. The nonvolatile memory management table 24 stores therein the information for managing or controlling the data stored in the nonvolatile memory 25.

With the structure of the controller 2a described above, the directory 21 and the cache 22 need not necessarily be made nonvolatile. What is to be nonvolatilized is the memory destined to store the write-after data which are not yet written in the disc 23j. Further, all the data within the cache 22 need not necessarily be stored in the nonvolatile memory 25. Accordingly, in general, the nonvolatile memory 25 for storing the data not yet written in the disc 23j of those data which are stored in the cache 22 need not be of a large capacity.

As will be understood from the above, the write-after data which are not yet written in the disc 23j are stored in duplicate in the cache 22 and the nonvolatile memory 25. Accordingly, even if memory trouble should occur in either one of the cache memory 22 or the nonvolatile memory 25, it can be ensured that the write-after data not yet written in the disc 23j is held in the other one of these memories. Thus, it is safe to say that the controller 2c has a high immunity to the memory trouble.

Figure 15A:
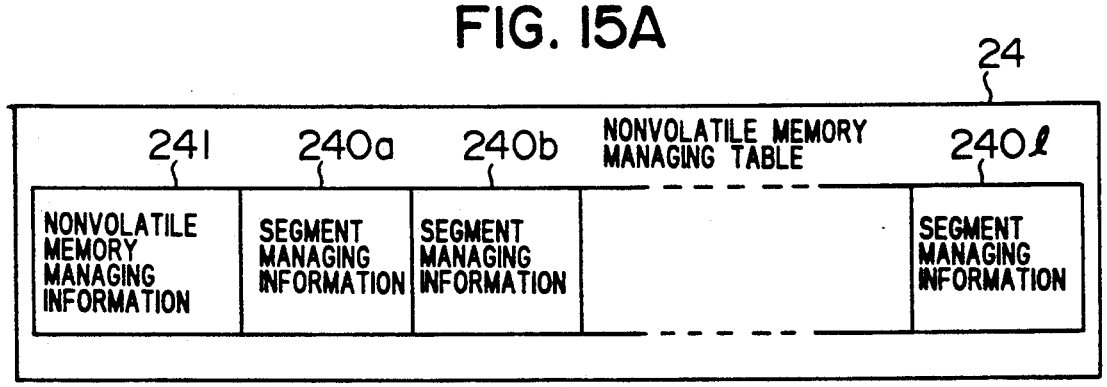
FIG. 15A is a diagram showing schematically a structure of a nonvolatile memory management table.
Figure 15B:
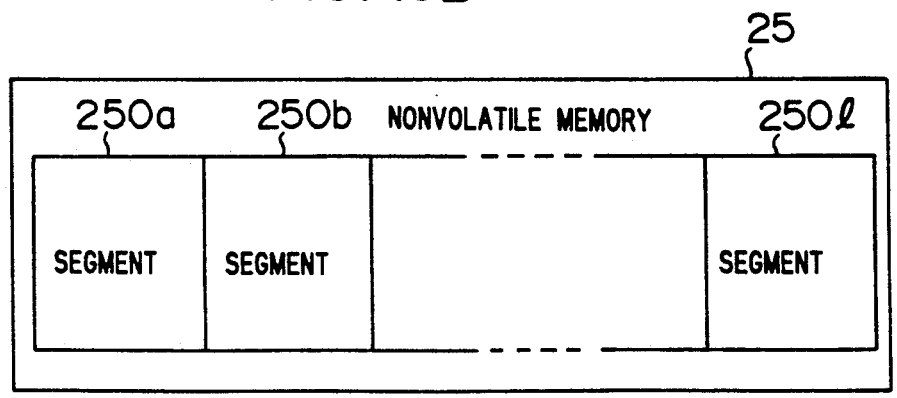
FIG. 15B is a diagram showing schematically a structure of a nonvolatile memory.

A structure of the nonvolatile memory 25 is shown in FIG. 15B. Referring to the figure, the nonvolatile memory 25 is segmented or divided into segments $250_k$ (where $k=1, 2, \ldots, 1$) each of a fixed length. Each segment $250_k$ is of a smaller capacity than the slot $220_i$ shown in FIG. 5B. Accordingly, in case a major proportion of the data within the slot $220_i$ are the data not yet written in the disc 23j, there may arise the necessity of allocating a plurality of segments $250_k$ to one slot $220_i$.

FIG. 15A shows a structure of the nonvolatile memory management information table 24. Concerning the particulars nonvolatile memory managing information 241 placed in the nonvolatile memory management table 24, description will be made later on.

The segment managing information $240_k$ (where $k=1, 2, \ldots, 1$) is provided in correspondence to each of the segments $250_k$. The segment managing information $240_k$ includes information required for writing the data stored in the nonvolatile memory 25 in the disc 23j in case the information stored in the cache 22 or the directory 21 is invalidated (due to failure in power supply, trouble in reading or the like).

Details of the information included in the segment managing information $240_k$ will be described later on.

The directory 21 is realized in the same structure as that shown in FIG. 5A and contains the directory managing information 211 and the slot managing information $210'_i$. It should however be noted that the slot managing information $210'_i$ contains a pointer indicating the segment of the nonvolatile memory 25 in which those of the data stored in the corresponding slot $220_i$ which are not yet written in the disc 23j are stored.

Figure 16:
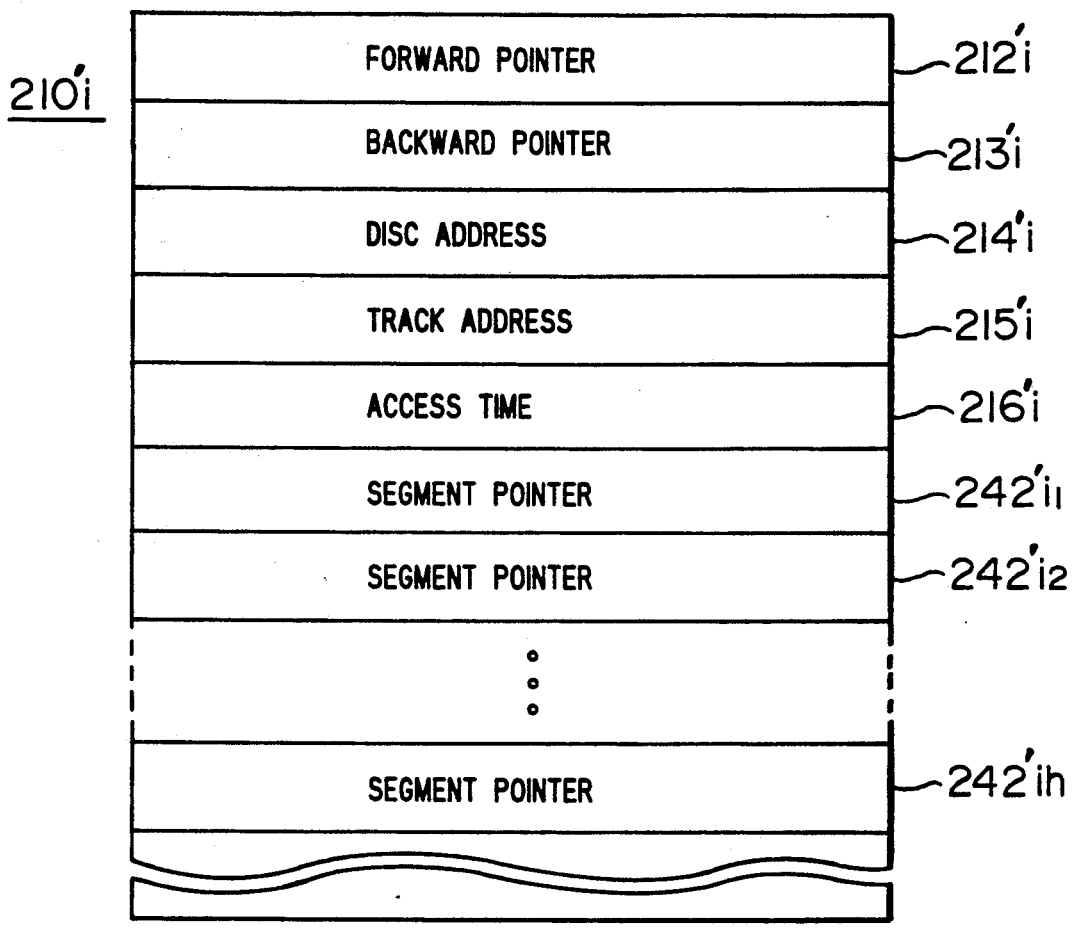
FIG. 16 is a diagram showing schematically a structure of the slot managing information table in case the nonvolatile memory is employed.

FIG. 16 shows a structure of the slot managing information table $210'_i$ containing the information of the pointers to the segments $250_k$. The slot managing information $210'_i$ shown in FIG. 16 differs from the slot managing information $210_i$ shown in FIG. 6 in that the pointer information (segment pointers) $242'_{i1}, 242'_{i2}, \ldots, 242'_{ih}$ to the segments $250_k$ are additionally provided in the case of the former. The number (h) of the segment pointers is given by the following expression:

$$h = (C_{sl}/C_{sg}) + 1 \quad (1)$$

where $C_{sl}$ represents the capacity of the slot $220_i$, and $C_{sg}$ represents the capacity of the segment $250_k$.

Figure 17:
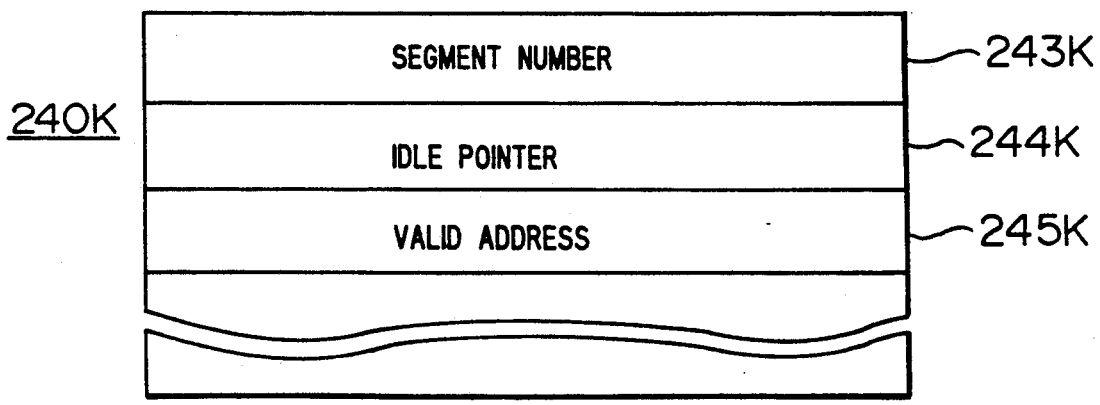
FIG. 17 is a diagram showing schematically a structure of a segment managing information table for managing segments of the nonvolatile memory.

FIG. 17 shows a structure of the segment managing information table $240_k$. It should however be noted that there are shown only the information which is necessary for elucidating the present invention. The segment managing information table $240_k$ contains segment number information $243_k$, idle pointer information $244_k$ and valid address information $245_k$.

The segment number information $243_k$ serves to indicate which of the segments the segment managing information $240_k$ corresponds to. As described hereinbefore, when the segment managing information and the segments are provided in one-to-one correspondence, the segment number can definitely be determined. In the case of the example shown in FIG. 17, the segment number is k. However, in the case where the segment managing information does not one-to-one correspond to the segments and in particular when the correspondence relation of concern is variable, the information is stored in the areas for storing the segment numbers for indicating the corresponding segments.

The blank or idle pointer $244_k$ is used for linking the corresponding segment $250_k$ which is not stored with the write-after data, i.e. which is in the unoccupied state, to other unoccupied segment. The linking method is similar to the unoccupied slot queue (37) managing method described hereinbefore in conjunction with FIG. 1.

The valid address information $245_k$ is used for indicating up to which address from the start address of the corresponding segments $250_k$ the write-after data are stored. In other words, the valid address $245_k$ assumes the value representing the final address up to which the valid data are stored in terms of the relative address from the start address of the segments $250_k$.

The idle pointer $244_k$ becomes valid when the value of the valid address $245_k$ is "0" (zero). In other words, the value of the idle pointer $244_k$ is of no significance when the valid address $245_k$ assumes other value than "0". Needless to say, when the writing of data stored in the segment $250_k$ to the disc 23j has been completed, the segment $250_k$ is handled as the unoccupied segment.

Figure 18:
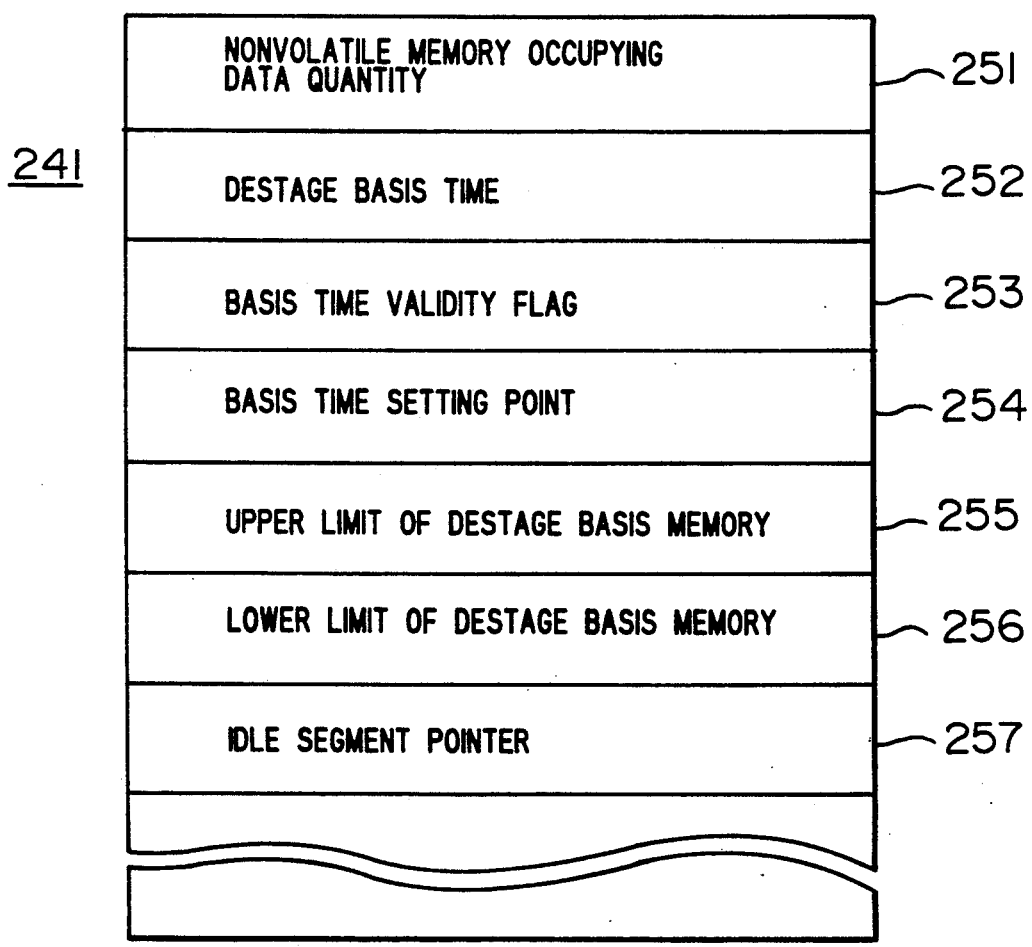
FIG. 18 is a diagram showing a structure of a nonvolatile memory managing information table.

Next, description is directed to the nonvolatile memory managing information table 241 by reference to FIG. 18. The nonvolatile memory managing information table 241 contains information concerning nonvolatile memory occupying data quantity 251, destage basis time 252, basis time validity flag 253, basis time setting time point 254, upper limit value 255 of a destage basis memory, lower limit value 256 of the destage basis memory and unoccupied segment pointer 257. In this conjunction, the term "destage" is used to mean the transfer of data stored in the nonvolatile memory 25 or the data stored in the cache 22 to the disc 23j.

The information of the nonvolatile memory occupying data quantity 251 indicates the quantity or amount of the write-after data stored in the nonvolatile memory 25. This memory occupying quantity may be expressed in terms of an absolute quantity or alternatively by the ratio of the occupation quantity to the total capacity of the nonvolatile memory 25.

The destage basis time 252 represents the temporal standard referred to upon selection of the slot $220_i$ to be subjected to the write-after processing. Concerning this information, description will be made in detail later on.

The basis time validity flag 253 indicates whether the destage basis time 252 is valid or not. The flag set to "ON" indicates the validity while the flag "OFF" indicates invalidity.

The information of the basis time setting time point 254 represents the time point at which the destage basis time 252 is next to be set. By way of example, it may be supposed that the destage basis time 252 is set at a predetermined constant time interval $\Delta t$. When the destage basis time 252 is set at a time point t, then the basis time setting time point information 254 is set to the value of $(t + \Delta t)$.

The upper limit value 252 of the destage basis memory is the data quantity information indicating that overflow of the nonvolatile memory 25 may take place when the write-after data is stored in the nonvolatile memory 25 beyond this upper limit value.

On the other hand, the lower limit value 256 of the basis memory is the information indicating that overflow will never occur in the nonvolatile memory 25 so long as the quantity of the write-after data stored in the nonvolatile memory 25 is below this lower limit value.

The purpose of establishing the two limit values, i.e. the upper limit value 255 and the lower limit value 256 for the destage basis memory is to impart hysteresis to the control for the start and the end of the write-after processing. Assuming that only one of the limit values is established, there arises the necessity for controlling frequently the start and the end of the write-after processing. With a view to suppressing such hunting phenomenon, the hysteresis is imparted.

The unoccupied segment pointer information 257 serves to manage the idle pointers $224_k$ corresponding to the segments which are in the unoccupied state, as described hereinbefore in conjunction with FIG. 17. The unoccupied segment pointer 257 is equivalent to the unoccupied slot pointer 34 for managing or controlling the unoccupied slots shown in FIG. 1 and differs from the latter in respect to the objective to be managed or controlled. Accordingly, the managing method similar to the unoccupied slot queue managing method described hereinbefore in conjunction with FIG. 1 may be adopted for managing the unoccupied segment pointers 257.

Next, description is turned to a problem which may arise when the nonvolatile memory 25 is employed.

As pointed out previously, the nonvolatile memory 25 is of a smaller capacity than the cache memory 22. Consequently, when the control described hereinbefore in conjunction with FIGS. 7, 10 and 11 is performed, a problem is encountered. Namely, when the slot corresponding to the slot managing information accessed at a time point preceding to the time point $216_{pp}$ (see FIG. 6) when the slot managing information 35 located at the LRU position of the replaceable queue ($210_{pp}$ in the case of the example illustrated in FIG. 1) is to be subjected to the write-after processing, the possibility that overflow may occur in the nonvolatile memory 25 is increased. This is the problem. For evading the problem, it is necessary to establish newly the reference or standard for the selection of the slots to undergo the write-after processing.

With a view to solving the problem mentioned above, there is provided the nonvolatile memory managing information table 241 described previously by reference to FIG. 18. Before entering into explanation of the processing in concrete, the underlying concept for dealing with the problem will be considered again by referring to FIG. 18.

In the first place, when the value of the nonvolatile memory occupying data quantity 251 is greater than the destage basis memory upper limit value 255, the basis time validity flag 253 is set "ON" and the slot to undergo the write-after processing is selected. In that case, there ar selected those slots $220_i$ whose access time points $216'_i$ are temporally in precedence to the time point a which the destage basis time point 252 was set. After having executed the write-after processing on the selected slots $220_i$, the corresponding segments (i.e. the segments corresponding to the segment managing information indicated by the segment pointers $242'_{i1}$–$242'_{ih}$) are released, whereon the capacity equal to that of these segments is subtracted from the value of the nonvolatile memory occupying data quantity 251. Unless the value of the nonvolatile memory occupying data quantity 251 becomes smaller than the destage basis memory lower limit value 256 as the result of the subtraction, the slot meeting the temporal condition mentioned above is again selected, whereon the similar processing is repeated. When the value of the nonvolatile memory occupying data quantity 251 becomes smaller than the destage basis memory lower limit value 256, the basis time validity flag 253 is reset to "OFF", whereupon the write-after processing comes to an end.

Next, a method of setting the destage basis time 252 will be explained. The destage basis time 252 is determined with reference to the access times $216'_i$ to the slot managing information $210'_i$ located at the LRU positions of the write-after queues $36j$ corresponding to the individual discs $23j$. By way of example, there may be conceived a method according to which a time point corresponding to a predetermined time lapse from the oldest of the access time points $216'_i$ at which accesses were made to the slot managing information $210'_i$ located at the LRU positions of all the write-after queues $36j$ is set as the destage basis time 252. As the alternative, a method described below may be adopted.

It is assumed that the access times $216'_i$ to the individual slot managing information $210'_i$ are distributed uniformly. With the selection of the slots to be subjected to the write-after processing, it is aimed to reduce the nonvolatile memory occupying data quantity 251 below the lower limit value 256 of the destage basis memory. Therefore, the slot to be left in the cache 22 should be decided in the following manner. First, it is assumed that the slot managing information $210'_i$ are arrayed such that the respective access time points $216_i$ are in the sequential order starting from that closest to the current time point. Then, if the slots $220_i$ are arrayed correspondingly in this order, those of the slots $220_i$ which are from the start slot to the slot which is located immediately before the slot by which the lower limit value 256 of the destage basis memory is exceeded are left in the cache 22. On the presumption of the uniform distribution of the access times, as mentioned above, the values of the access times $216'_i$ for the slots $220_i$ selected to be left in the cache 22 should be closer to the current time point than a time point T given by the following expression.

$$T = T_p - (T_p - T_{pp}) \times C_{up}/C_{oq} \qquad (2)$$

where $T_p$ represents the current time point, $T_{pp}$ represents the oldest of the access times to the slot managing information at the LRU positions in the individual write-after queues, $C_{up}$ represents the lower limit value of the destage basis memory, and $C_{oq}$ represents the nonvolatile memory occupying data quantity.

Thus, the time T given by the expression (2) may be set as the destage basis time 252, and those of the slots $220'_i$ which correspond to the slot managing information $210'_i$ accessed at the access time points $216'_i$ preceding to the time T may be selected as the slots to be subjected to the write-after processing.

Figure 19:
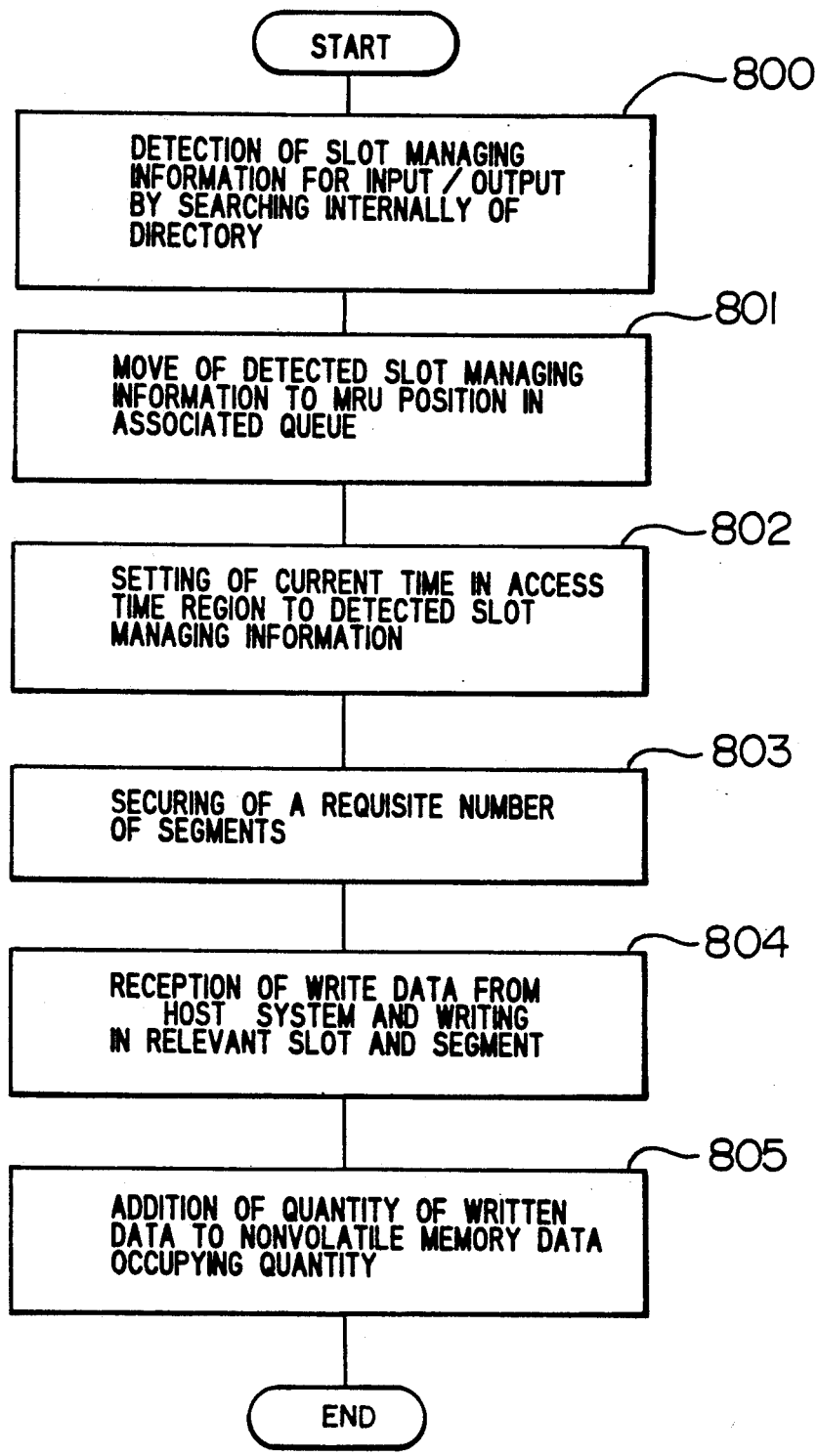
FIG. 19 is a flow chart for illustrating a write-hit processing performed by the director in response to a write request received from a HOST system in the case where the controller is provided with the nonvolatile memory.
Figure 20:
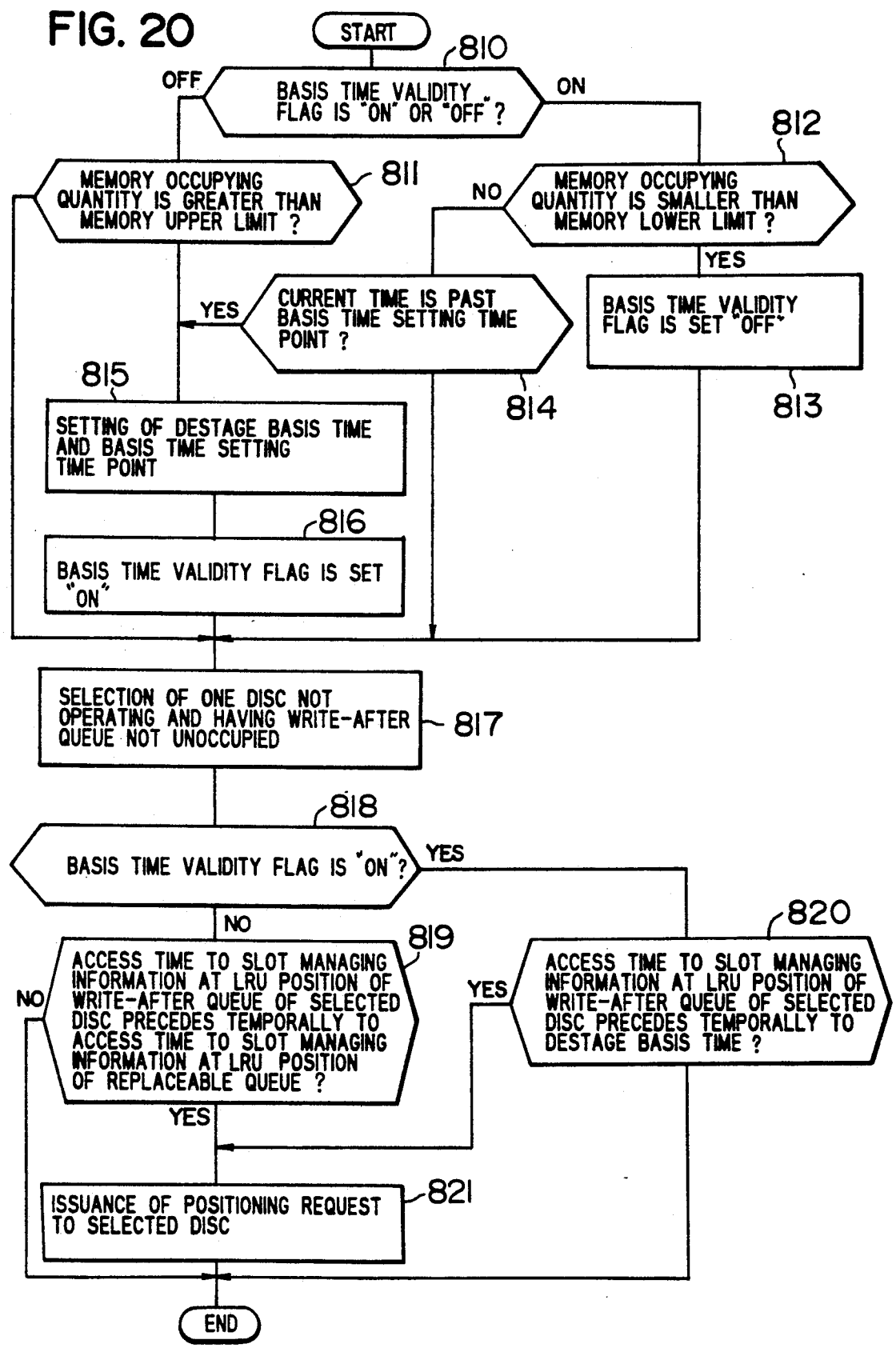
FIG. 20 is a flow chart for illustrating a processing performed by the director for issuing a positioning request to the disc unit in the write-after processing in the case where the controller is provided with the nonvolatile memory.
Figure 21:
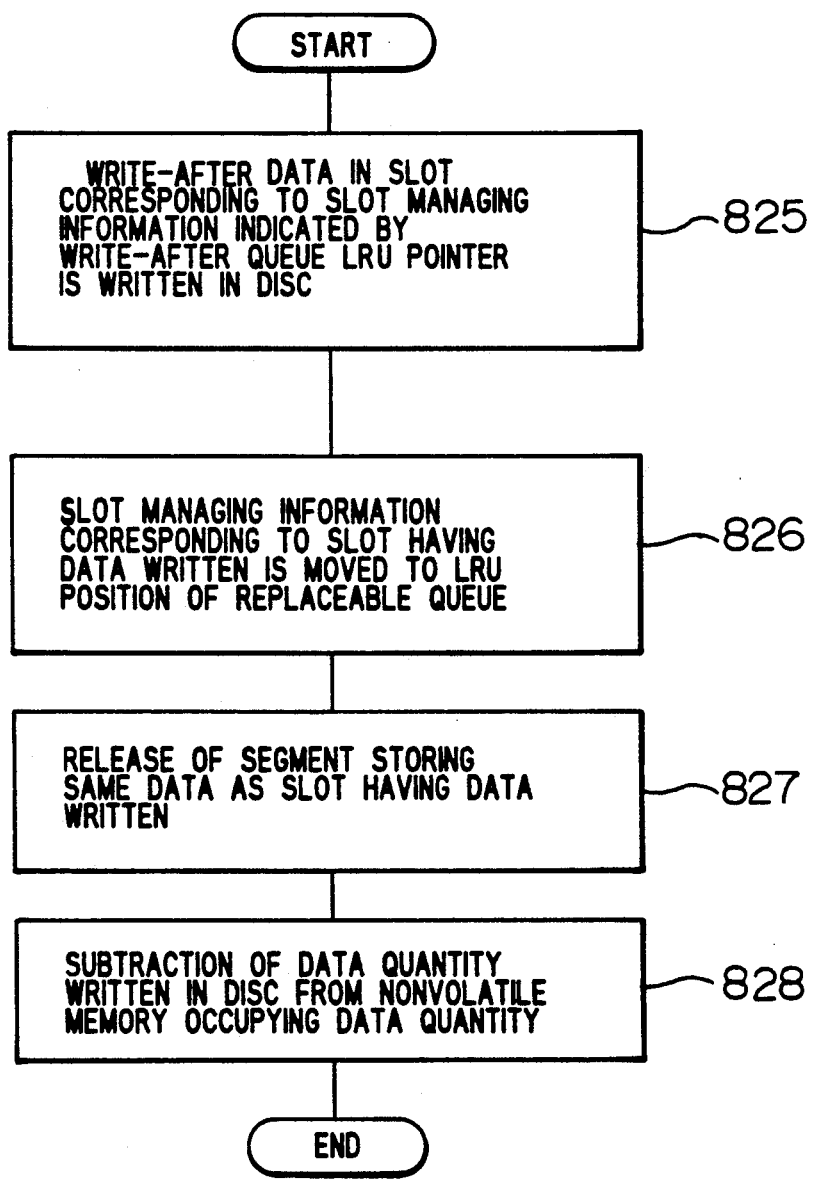
FIG. 21 is a flow chart for illustrating a processing performed by the director upon reception of the completed positioning indication from the disc unit in the write-after processing in the case where the controller includes the nonvolatile memory.

Now, description is turned to the processing performed according to the instant embodiment of the invention. FIGS. 19, 20 and 21 are diagrams corresponding to FIGS. 7, 10 and 11, respectively, which were referred to in the description of the preceding embodiment. The following description is primarily directed to the differences from the processing according to the preceding embodiment.

FIG. 19 shows in a flow chart the processing corresponding to that shown in FIG. 7, which processing is executed by the director 20 when the write request received from the HOST system 1 is hit.

Since steps 800 to 802 shown in FIG. 19 are similar to the processing steps 700 to 702, repeated description of those steps 800 to 802 will be unnecessary.

At a step 803, the segments $250_k$ are secured in accordance with the quantity or amount of the write data received from the HOST system 1. The number of the segments $250_k$ to be secured can be determined in accordance with the expression (1) mentioned hereinbefore. The segments $250_k$ may be secured in the manner described below. Namely, the segments indicated by the unoccupied segment pointers 257 may be stored in the segment pointers $242'_i$ shown in FIG. 16. Needless to say, the values of the unoccupied segment pointers 257 are correspondingly altered.

A step 804 shown in FIG. 19 corresponds to the step 703 shown in FIG. 7 except for a difference in that the write data received from the HOST system 1 are stored not only in the slot $220_i$ but also in the segment $250_k$ secured at the step 803.

At a step 805, the quantity of the write data is added to the value of the nonvolatile memory occupying data quantity 251.

Next, description is turned to the processing corresponding to that shown in FIG. 10, i.e. the processing which is executed by the director 20 to issue the positioning request to the discs $23_j$ for executing the write after processing. This processing is illustrated in a flow chart in FIG. 20.

At a step 810, decision is made as to whether the basis time validity flag 253 is "ON" or "OFF". If it is "OFF", the processing branches to a step 811 otherwise to a step 812.

At a step 811, decision is made as to whether or not the nonvolatile memory occupying data quantity 251 exceeds the upper limit value 255 of the destage basis memory. If the former is exceeded, the processing branches to a step 815 and otherwise to a step 817.

At a step 812 it is decided whether or not the nonvolatile memory occupying data quantity 251 is smaller than the lower limit value 256 of the destage basis memory. If the former is smaller than the latter, the processing branches to a step 813, and otherwise to a step 814.

At the step 813, the basis time validity flag 253 is reset to "OFF", because of no necessity for the write-after processing related to the nonvolatile memory occupying data quantity 251 since it is smaller than the lower limit value 256 of the destage basis memory. Subsequently, the processing branches to a step 817.

At the step 814, decision is made as to whether or not the current time is past the basis time setting time point 254. If the result of decision is affirmative (YES), the processing branches to the step 815. If it is negative (NO), the processing branches to the step 817.

At the step 815, the destage basis time 252 as well as the basis time setting time point 254 are newly set because the nonvolatile memory occupying data quantity 251 exceeds the upper limit value 255 of the destage basis memory or because the current time is already past the basis time setting time point 254.

At a step 816, the basis time validity flag 253 is set to "ON" because of possibility of overflow of the nonvolatile memory 25.

The step 817 is similar to the processing step 705 shown in FIG. 10. As the result of the processing, one disc $23_j$ is selected.

At a step 818, decision is made as to whether the basis time validity flag 253 is "ON" or "OFF", as in the case of the step 810. If the flag is "OFF", the processing branches to a step 820. If it is "ON", the processing branches to a step 819.

The step 819 is similar to the processing step 706 shown in FIG. 10. Thus, decision is made as to whether or not the time point at which the slot managing information located at the LRU position of the write-after queue of the selected disc $23_j$ was accessed precedes temporally to the time when the slot managing information located at the LRU position of the replaceable queue 35 was accessed. If the result of this decision step is affirmative (YES), the processing branches to a step 821. If otherwise, the processing comes to an end.

At the step 820, decision is made as to whether or not the access time to the slot managing information located at the LRU position in the write-after queue $36_j$ of the selected disc $23_j$ precedes temporally to the value of the destage basis time point 252. If so, the processing branches to a step 821. Otherwise, the processing comes to an end.

At the step 821, the positioning request is issued to the selected disc $23_j$.

Next, description is turned to the processing which corresponds to that shown in FIG. 11, i.e. the processing executed by the director 20 upon reception of the completed positioning indication from the disc $23_j$. FIG. 21 shows this processing in a flow chart.

Referring to FIG. 21, at steps 825 and 826, the processings similar to those at the steps 710 and 711 shown in FIG. 11 are performed. As the result of these processings, data placed in the slot $220_i$ are written onto the disc $23_j$. Upon completion of this data writing or transfer, the queue processing for the slot $220_i$ has been completed.

At a step 827, the segment $250_k$ storing therein the same data as that of the slot $220_i$ is released. More specifically, the segment $250_k$ is disconnected from the segment pointer $242'_i$ of the slot managing information $200'_i$ and connected to the blank or idle pointer $244_k$. Since such pointer manipulation has been described previously, repeated description will be unnecessary.

At a step 828, the quantity of data written in the disc $23_j$ is subtracted from the nonvolatile memory occupying data quantity 251.

As will now be understood from the above description, the present invention applied to the controller provided with the nonvolatile memory in addition to the cache constituted by a nonvolatile memory allows the disc-based parallelism and hence throughput to be significantly improved.

Further, in the case where the write-after data is stored not only in the cache but also in the nonvolatile memory in an effort to ensure the reliability, it is expected that the time required for the disc seek/search can be decreased as a whole by selecting the slots to be subjected to the write-after processing in view of the quantity or amount of the data occupying the above-mentioned nonvolatile memory.

Still another embodiment of the present invention will be described. According to this embodiment, all the write-after data are stored in the nonvolatile memory 25 in the structure shown in FIG. 14 for the purpose of assuring the reliability. It should however be noted that the high reliability is not necessarily required for all the write-after processings. Further, the range of data to be stored in the nonvolatile memory 25 should preferably be limited so far as it is possible in view of the fact that the capacity of the nonvolatile memory 25 can be made smaller and that overhead involved in the data write-/read processing for the nonvolatile memory 25 can be reduced. Such being the circumstances, the write-after processings may be classified to high reliability write-after processings for which a high reliability is required and normal level write-after processings for which such high reliability is not required, i.e. the reliability of normal level is sufficient. In the case of the high reliability write-after processing, the write-after data is stored no only in the cache 22 but also in the nonvolatile memory 25. On the other hand, in the normal level write-after processing, the write-after data is not stored in the nonvolatile memory 25 but in the cache 22 only.

Figure 22:
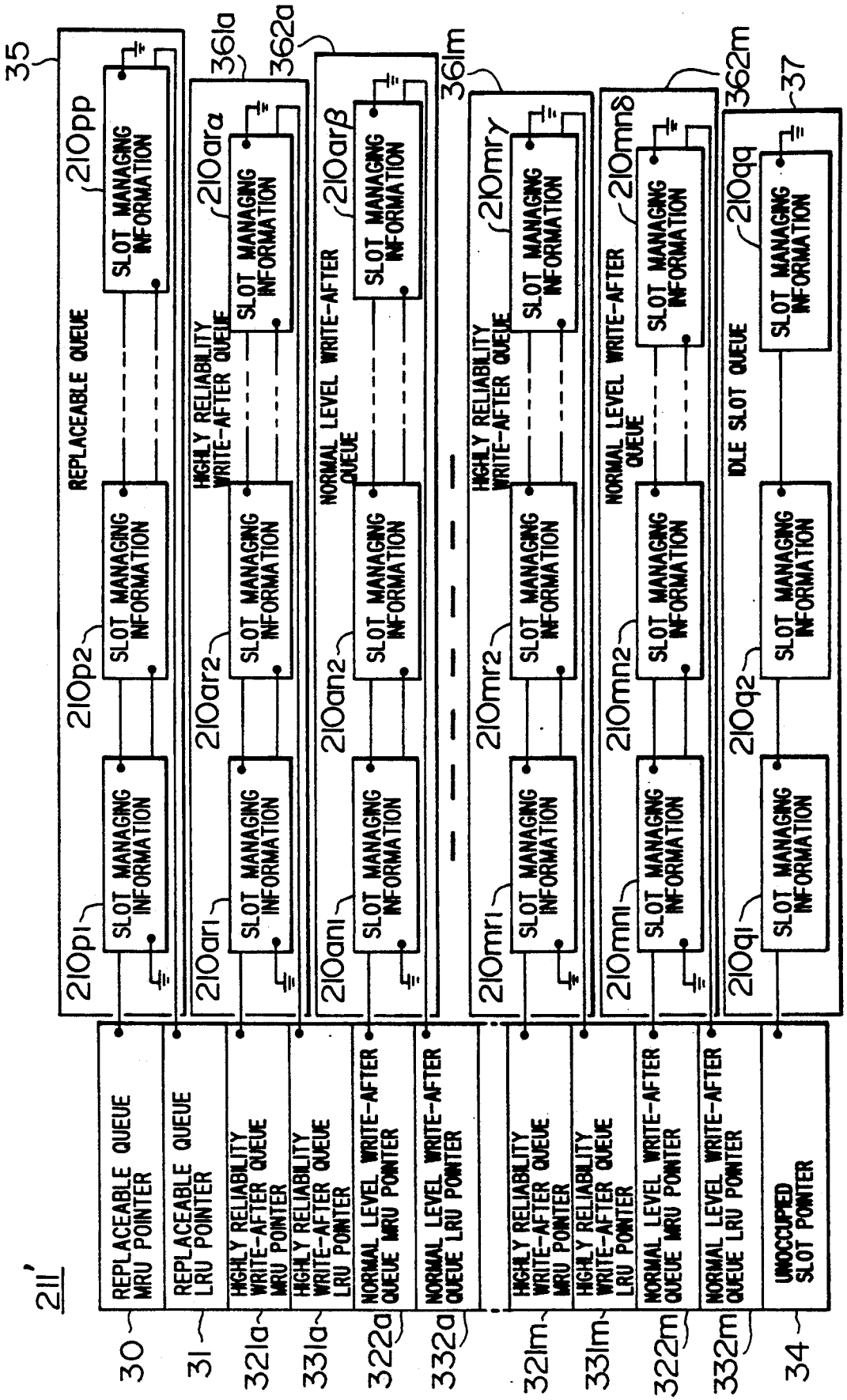
FIG. 22 is a diagram showing, by way of example, a structure of the directory in the controller including the nonvolatile memory.

FIG. 22 shows a structure of the directory 21 implemented on the basis of the concept described above. Comparison of FIG. 22 with FIG. 1 shows differences in the respects described below.

A first difference is seen in that the write-after queues 36j for every disc 23j are classified to high reliability write-after queues 361j and normal level write-after queues 362j.

Due to the first difference mentioned above, difference necessarily arises with regard to the structure of the directory management information table 211 for managing the write-after queues. This is the second difference.

In conjunction with the second difference, description will briefly be made of the structure of new directory management information table 211'. In the case of the structure shown in FIG. 1, there are provided the write-after queue MRU pointers 33j in correspondence to the individual write-after queues, respectively. In the case of the structure shown in FIG. 22, there are provided high reliability write-after queue MRU pointer 321j and high reliability write-after LRU pointers 331j for the high reliability write-after queues 361j, while normal level write-after queue MRU pointers 322j and normal level write-after queue LRU pointers 332j are provided in connection with the normal level write-after queues 362j.

In the structure described above, the queue and pointer operations or manipulations are similar to those described hereinbefore in conjunction with the preceding embodiments. Accordingly, repeated description in detail thereof will be unnecessary. It is sufficient to elucidate the differences brought about by the queue classification into the high reliability write-after queues 361j and the normal level write-after queues 362j.

With regard to the high reliability write-after queue 361j, it is mentioned that since the data to be written in the disc 23j is stored in the nonvolatile memory 25 and in the cache, the data stored in the nonvolatile memory 25 is written in the disc 23j when the quantity of data stored in the nonvolatile memory 25, i.e. the nonvolatile memory occupying data quantity mentioned previously in connection with the second embodiment, exceeds a predetermined value. In other words, so far as the high reliability write-after queue 361j is concerned, the control may be performed essentially in the same way as in the case of the second embodiment of the invention.

On the other hand, in conjunction with the normal level write-after queue 362j, it is noted that since the data to be written in the disc 23j is stored in the cache, data of the slot corresponding to the slot information having the access time point $216_i$ preceding temporally to the access time point $216_{pp}$ of the slot managing information $210_{pp}$ located at the LRU position of the replaceable queue 35 may be written onto the disc 23j. In other words, with regard to the normal level write-after queue 362j, the control may be performed essentially in the same manner as in the case of the first embodiment of the invention.

The instant embodiment of the invention can easily be understood by those skilled in the art from the above explanation. Further, the processings are performed essentially in the same manner as in the case of the first and second embodiments. Accordingly, it is believed that any further description of the instant (third) embodiment of the invention is unnecessary.

According to the teachings of the invention incarnated in the illustrative embodiments described above, the disc-based write-after processings can be executed in parallel with a high efficiency by dividing and managing the slots required for the write-after processing on a disc basis.

What is claimed is:

1. In a control apparatus connected to a plurality of input and output units and internally provided with a memory divided into a plurality of storage areas, a method of controlling a data input/output operation comprising the steps of:

loading data from said input units into said plurality of storage areas;

storing said data loaded from said input units in said storage areas, said stored data to be output to said output units in response to an output request issued to said output units from a host system;

writing data to corresponding ones of said output units in response to said output request; and correspondingly grouping those of said storage areas in which said data outputted in response to said output are stored but from which said data has not yet been written to said output units, to a group of said output units to which said data outputted in response to said output request are to be written, thereby allowing each of said respective groups of storage areas to be managed as a writing attribute group.

2. A method of controlling a data input/output operation according to claim 1, wherein those of said storage areas which contain said loaded input data but do not contain said data outputted in response to said output request and are not correspondingly grouped to respective output units, are managed as a reading attribute group.

3. A method of controlling a data input/output operation according to claim 2, wherein those of said storage areas in which said data loaded from said input units are not stored are managed as an empty attribute group.

4. A method of controlling a data input/output operation according to claim 1, wherein said requested output data is written to corresponding output units, in sequential order, by those of said writing attribute storage areas having been least recently requested for output data.

5. A method for controlling a data input/output operation according to claim 4, wherein those of said writing attribute storage areas from which said requested output data have been written to corresponding output units, are excluded from management as one of said writing attribute group storage areas, and are thereafter managed as one of said reading attribute group storage areas.

6. In a control apparatus connected to at least one input/output unit and internally provided with a memory divided into a plurality of storage areas, a method of controlling data input/output operation comprising the steps of:
   loading data from said input units into said plurality of storage areas;
   storing said data loaded from said input units in said storage areas, said stored data to be output to said output units in response to an output request issued to said output units from a host system;
   writing data outputted to corresponding ones of said output units in response to said output request; and
   correspondingly grouping those of said storage areas in which said data outputted in response to said output request are stored but from which said requested data has not yet been written to said output units, to a group of said output units to which said data outputted in response to said output request are to be written, to thereby allow each of said respective groups of storage areas to be managed as a writing attribute group, and
   wherein those of said storage areas which contain said loaded input data but do not contain said data outputted in response to said output request and are not correspondingly grouped to a respective output unit are managed as a reading attribute group.

7. A method for controlling a data input/output operation according to claim 6, wherein said requested output data is written to corresponding output units, in sequential order, by those of said writing attribute storage areas having been least recently requested for output data.

8. In a control apparatus connected to input/output units and internally provided with a first memory and a second memory each divided into a plurality of storage areas, a method of controlling data input/output operation comprising the steps of:
   loading data from said input units into said storage areas of said first memory;
   storing said data loaded from said input units, in said storage areas of said first and second memories, said stored data to be output to said output units in response to an output request issued to said output units from a host system;
   writing said requested output data stored in said storage areas of said first memory to corresponding output units; and
   correspondingly grouping said storage areas of said first memory and said second memory in which said data outputted in response to said output request are stored but from which said requested output data has not yet been written to said output units, to a group of said output units to which said requested output data are to be written, to thereby allow each of said respective groups of memory storage areas to be managed as a written attribute group.

9. A method for controlling a data input/output operation method according to claim 8, wherein those of said storage areas of said first memory which do not contain said data outputted in response to said output request and are not correspondingly grouped to respective output units are managed as a reading attribute group.

10. A method for controlling a data input/output operation according to claim 9, wherein those of said writing attribute storage areas of said first memory and said second memory from which said requested output data have been written to corresponding output units are excluded from management as one of said writing attribute group storage areas, and are thereafter managed as one of said reading attribute group storage areas.

11. A method for controlling a data input/output operation according to claim 9, wherein said requested output data from said storage areas of said first memory is written to corresponding output units, in sequential order, by those of said written attribute storage areas having been least recently requested for output data.

12. A method for controlling a data input/output operation according to claim 11, wherein said requested output data is written to corresponding output units, in sequential order, by the storage area of said first memory having been least recently requested for output data.

13. A method for controlling a data input/output operation according to claim 8, wherein said requested output data from said storage areas of said first memory are written into said corresponding output units when a data storage quantity of said second memory exceeds a first predetermined capacity.

14. A method for controlling a data input/output operation according to claim 8, wherein said requested output data from said storage areas of said first memory are written into said corresponding output units upon a data storage quantity of said second memory exceeding a first predetermined upper capacity until said data storage capacity of said second memory becomes smaller than a predetermined lower capacity.

15. A method for controlling a data input/output operation according to claim 8, wherein said data from said storage area of said second memory is written to corresponding output units.

16. In a control apparatus connected to at least one input/output unit and internally provided with first and second memories divided into a plurality of storage areas, a method of controlling data input/output operation comprising the steps of:
   loading data from said input units into said storage areas of said first memory;
   storing said data loaded from said input units in said storage areas of said first memory in response to a low reliability output request issued by a host system for data for which high reliability is not required;

storing said data loaded from said input means in response to a high reliability output request issued by said host system for data for which high reliability is required in said storage areas of said first memory and said second memory;

writing said data stored in said first memory according to said low reliability output request of said high reliability output request to said output units;

grouping those of said storage areas in said first memory requested according to said low reliability request but have not yet been written to said outputs units as being a low reliability writing attribute group of storage areas; and grouping those of said storage areas in said first memory requested according to said high reliability request but have not yet been written to said output units as being a high reliability writing attribute group.

17. A method for controlling a data input/output operation according to claim 16, wherein said output data requested by said high reliability output request stored in said storage areas of said second memory are written to corresponding output units.

18. In a control apparatus connected to a plurality of input/output units and internally provided with a memory divided into a plurality of storage areas, a method of controlling data input/output operation comprising the steps of:

loading data from said input units into said storage areas of said memory;

storing data loaded into said storage areas of said memory;

correspondingly grouping said storage areas with said plurality of output units to which said data stored in said storage areas is output;

writing said data from more than one of said storage areas to said corresponding plurality of output units in parallel.

19. A control apparatus according to claim 18, further comprising:

a first memory connected to said cache memory; and a second memory connected to said cache memory for storing storage area management information similar to those stored in said directory, said storage area management information managing said first memory in correspondence with said input/output units, wherein data stored in either one of said cache memory or said first memory is output to said output units by consulting said storage area management information stored in at least one of said directory and said second memory.

20. An input/output control apparatus according to claim 19, wherein said first and second memories are constituted by a nonvolatile memory.

21. An input/output control apparatus for a computer system comprising a host system, at least one input/output unit and a control apparatus, said control apparatus comprising:

a plurality of storage areas for storing logically derived data;

a cache memory for managing said logically derived data in said plurality of storage areas;

a directory for storing storage area management information for controlling said cache memory according to output output data requests issued by said host system to said input/output units; and a processor, connected to said cache memory and said directory, for controlling data output from said cache memory to said output unit by referring to said storage area management information stored in said directory, wherein said directory contains storage area management information which is so dynamically updated as to correspondingly group said storage areas storing therein said requested output data to each of said output units to which said requested output data are to be written, to thereby manage said group as a writing attribute group.

22. An input/output control apparatus according to claim 21, further comprising:

a first memory connected to said processor;

a second memory connected to said processor for storing said control information for controlling said first memory in accordance with said input/output units, wherein said processor transfers said requested output data stored in either one of said cache memory and said first memory to said corresponding output unit by consulting said storage area management information stored in at least one of said directory and said second memory.

23. An input/output apparatus connected to at least one input/output unit and internally provided with a first memory and a second memory, both of which are divided into a plurality of storage areas, said input/output apparatus comprising:

means for loading data from said input/output unit into said storage areas of said first memory;

means for writing data from said storage areas to said input/output means, according to an output request from a host system;

means for storing said data written according to said output request in said first and second memory;

means for correspondingly grouping those of said storage areas of said first memory in which said requested output data has not yet been written to said output units to a group of said input/output units to which said requested output data are to be written, said respective groups of first memory storage means being managed as a writing attribute group.

24. An input/output control apparatus connected to at least one input/output unit and internally provided with a first memory and a second memory, both of which are divided into a plurality of storage areas, said input/output control apparatus comprising:

means for loading data from said input/output unit into said storage areas of said first memory;

means for storing said data written according to a low reliability output request from said host system in said first memory;

means for storing said data written according to a high reliability output request from said host system in said first and second memories;

means for writing said data requested according to either of said low reliability output request and said high reliability output request from said first memory to said output unit;

means for correspondingly grouping those of said storage areas of said first memory in which said output data, according to said low reliability output request, has not yet been written to said output units to a group of said input/output units to which said requested output data are to be written, said respective groups of first memory storage means being managed as a low reliability writing attribute group; and means for correspondingly grouping those of said storage areas of said first memory in which said output data, according to said high reliability output request, has not yet been written to said output units to a group of said input/output units to which said requested output data are to be written, said respective groups of first memory storage means being managed as a high reliability writing attribute group.

25. An input/output control apparatus according to at least one input/output unit and cooperating with a host system, said control apparatus comprising:

a cache memory logically divided into a plurality of storage areas;

a directory having a plurality of storage area management information corresponding to said cache memory storage areas;

means for loading data from said input units into said cache memory storage areas;

means for writing data from said cache memory storage areas into said output units in response to an output request from said host system; and means for correspondingly grouping those of said cache memory storage areas in which said requested output data are stored but have not yet been written to said output units to those of said output units to which said requested output data is to be written, said grouped cache memory storage areas comprising a writing attribute group.

* * * * *